United States Patent [19]

Hedström et al.

[11] 4,069,784

[45] Jan. 24, 1978

[54] METHOD AND DEVICE FOR PRODUCING SUBSTANTIALLY KINEMATIC STEERING OF A VESSEL

[75] Inventors: Bror Folke Hedström, Stockholm; Per Thorvald Persson, Sundbyberg, both of Sweden

[73] Assignee: Kockums Automation AB, Malmo, Sweden

[21] Appl. No.: 639,886

[22] Filed: Dec. 11, 1975

[30] Foreign Application Priority Data

Dec. 11, 1974 Sweden .............................. 74-15523

[51] Int. Cl.² ......................................... B63H 25/04
[52] U.S. Cl. ................................ 114/144 E; 244/175; 318/588; 364/424
[58] Field of Search ...................... 73/178 R; 180/79.1; 114/144 A, 144 B, 144 E; 235/150.2, 150.26, 150.27; 244/175, 184, 189, 3.14, 3.19, 3.2; 318/580, 581, 586, 588; 340/27 R, 27 NA; 343/107, 112 R, 112 PT

[56] References Cited

U.S. PATENT DOCUMENTS

| 3,133,520 | 5/1964 | Bentkowsky et al. ............ 114/144 E |
| 3,362,658 | 1/1968 | Ito et al. ......................... 235/150.2 X |
| 3,676,648 | 7/1972 | Wesner .............................. 318/588 X |
| 3,784,800 | 1/1974 | Willoteaux ................... 235/150.26 X |
| 3,786,505 | 1/1974 | Rennie ......................... 235/150.27 X |
| 3,848,114 | 11/1974 | Campbell et al. ................ 235/150.26 |

*Primary Examiner*—Stephen G. Kunin
*Attorney, Agent, or Firm*—Berman, Aisenberg & Platt

[57] ABSTRACT

The invention provides a method and device for producing substantially kinematic steering of a vessel in a yaw path having a given radius of curvature conforming with a predetermined control law. During the steady state phase of the yaw when there exist conditions for dealing with an easily controllable radius of curvature and in the vessel is steered by rudder deflection changes and by utilizing servo control methods in such a way that the radius of curvature of the vessel, which has been determined by instrument facilities aboard the vessel, follows a predetermined suitable program for the yaw curvature during the yaw.

37 Claims, 41 Drawing Figures

YAW LAY-OUT PLATE

COURSE ANGLE ACTUAL VALUE
MODEL GENERATOR

METHOD AND DEVICE FOR PRODUCING SUBSTANTIALLY KINEMATIC STEERING OF A VESSEL

BACKGROUND OF THE INVENTION

1. Field of the Invention

The present invention relates to substantially kinematic steering of a vessel in a yaw path having a given radius of curvature conforms with a predetermined control law.

2. Description of the Prior Art

The navigation and steering problems which will be dealt with pertain to vessels which have a steering-dynamic inertia such that water-ways intended for such vessels can be regarded as narrow. Examples thereof are large tankers when mooring along a coast or large ferries maneuvering in coast traffic. In the following, the actual water-ways for such vessels will be referred to as navigable passages. The fundamental principle of navigation in such passages is to check continuously the position of the vessel. The navigator knows where the vessel is relative to suitable reference marks (beacons, lights, capes, etc.). The position of the vessel expressed in absolute coordinates, for instance longitude and latitude, is not essential. However, the position is checked by observations, for instance ocular observations, and radar observations of the surroundings. In navigable passages, courses are taken from charts or by means of course lines on a navigation radar indicator. An established course is maintained by observing the compass and by observing the yaw angular rate on an instrument.

Small course changes do not create any major problems. The need for such changes can be recognized by simple ocular observations e.g., when navigating along leading lines, or by a course line on a radar indicator. Also, the steering onto such corrected courses does not seem to a dominating problem. The yaw angle rate instrument seems to be a good facility for such steering. In connection with large course changes where the narrowness of the yaw is dependent on passage conditions, the difficulties in steering will increase rapidly. It is difficult to predict as accurately as desired the position after the yaw has been completed. A common method of steering during a yaw can be described as follows.

The vessel moves along a straight course in the passage, here termed the actual course. It is required to turn through a gate and after said gate a new straight course has to be obtained, here termed the exit course. The exit course can be taken from a chart or by means of a course line on the radar indicator. The yaw is carried out by ordering a certain rudder deflection (rudder angle) which is based on experience.

Thus, the yaw carried out as described above is initiated at a certain "set point" which can be determined by observations (visually or by radar). Due to inertia of the rudder system, the moement of the vessel, etc., the set point is selected to lie a certain distance, determined by experience, ahead of the point of the path where the yaw is assumed to have a more or less fixed yaw center. Considering the desired narrowness of the yaw, the commander orders a certain rudder deflection, for instance starboard 20°. In view of the decrease of speed due to the yaw, drift, etc., the commander cannot be quite sure of the position of the vessel after the yaw has been completed. Relatively large position errors can occur relative to the navigable passage. There is a need for experienced and observant navigators and observers in order to achieve a good yaw.

Just before the new straight course (i.e., the exit course) has been obtained, the commander orders (repeats) the new course, and the helmsman abandons the fixed rudder angle and, by means of a compass, the yaw angle rate meter and general experience, he steers to the new course. During this transition, corrections must also be made for errors in the vessel's lateral position which occurred during the yaw. To effectuate such corrections, maneuvering space is needed. Such space is obtained by making the yaw narrower than would otherwise have been necessary in view of the bottom topography or other obstacles. Narrow yaws in navigable passages are quite burdensome, both as to the personnel involved as well as economically. The personnel must have highly developed powers of observation and a great amount of experience, both being of great importance for the safety of the steering procedure. Economically, a narrow yaw represents a loss of energy due to a decrease in speed. The speed can decrease considerably during a narrow yaw. The comfort of the passengers can also be adversely affected by a narrow yaw.

A proven alternative way of steering is to predict the movement and the path of the vessel for a number of vessel lengths ahead by means of instrument calculation facilities, for instance a computer, with due consideration given to the external environment (bottom characteristics, drift, etc.), the rudder deflection of the vessel, state of movement and the dynamic characteristics of the vessel. The predicted path is presented, e.g., on a radar indicator and thus can form the basis for steering. The drawback of such a method is that well defined information about the dynamic characteristics of the vessel is required and such characteristics often change very complicated (involving up to several tens of dynamic parameters). Since the parameters can change due to, for instance the bottom characteristics in shallow waters, the overall accuracy of steering can be poor. The foregoing indicates that there exists a need and a desire for an improved method of navigation and steering.

SUMMARY OF THE INVENTION

The basic idea of the present invention is that, during the steady state phase i.e., during the phase of the yaw when there exists conditions for dealing with an easily controllable radius of curvature, it is endeavoured to steer the vessel by rudder deflection changes and by utilizing servo control methods in such a way that the radius of curvature of the vessel, which has been determined by instrument facilities aboard the vessel, follows a predetermined suitable program for the yaw curvature during a yaw. Hereinafter, the radius of path curvature in the yaw program or the planned model of a desired yaw will be referred to as the set radius.

Accordingly, the invention provides a method of the kind referred to initially comprising the steps of determining, in a path model, the set value from one of the radius of path curvature $R_b$ or the path angular rate $\omega = V/R_b$ of the vessel, determining the actual value of the path angular rate $\omega_a$ and the radius of path curvature $R_a = V/\omega_a$ of the vessel, V being a measure at least approximately of the speed over ground of the vessel, generating a control signal from the values thus determined, which is a function of one of the quantities $R_b - R_a$, $R_b^{-1} - R_a^{-1}$, $\omega_b - \omega_a$, $\omega_b^{-1} - \omega_a^{-1}$ and $V - R_b$ $\omega_a$, and effecting in dependence thereon a change in rudder position required for minimizing the control signal.

Also, the invention relates to a device for carrying said method into effect comprising means for determining the actual value of the path angular rate $\omega_a$ and the radius of path curvature $R_a = V/\omega_a$ of the vessel, V being a measure at least approximately of the speed over ground of the vessel, means for generating a control signal from said values and from the set value of one of the quantities: radius of path curvature $R_b$ and path angular rate $\omega_b = V/R_b$, determined by means of the path model, a conrol signal being a function of one of the quantities: $R_b - R_a$, $R_b^{-1} - R_a^{-1}$, $\omega_b - \omega_a$, $\omega_b^{-1} - \omega_a^{-1}$ and $V - R_b \omega_a$, and means for utilizing said control signal when adjusting the rudder position of the vessel.

The set radius is determined either on a chart by means of a caliper or yaw lay-outs or by means of a display unit. On the latter there may be presented an image of the vessel surroundings, for instance in the form of a radar PPI-image, and also a path mathematically defined by curves and lines, which path can be positioned on the image of the surroundings by control means in a way favorable to the approaching passage. By continuously imaging the remaining part of the planned yaw in an image presentation during the yaw proper, it is possible to discover and to correct derived path deviations at an early stage.

It is most obvious (and perhaps easiest) to operate with a constant radius of path curvature. In any case, a constant value of the radius of path curvature, corresponding to a circular yaw path, is preferred when a chart is used as the basis for planning the yaw. If said radius is determined in connection with the generation and presentation of a desired yaw path procedure, e.g., on a radar indicator, another type of path, for instance an elliptical path, can be an alternative.

If the actual instrument facilities aboard the vessel, e.g., log systems, compasses, angular rate meters, auxiliary calculation means and similar units, are operating with sufficient accuracy, the path described by the vessel during the steady state phase of the yaw can be regarded as geometrically given. Disturbances arising from drift, varying bottom characteristics in shallow waters, varying dynamic characteristics of the vessel, etc., in this case will result in minor feedback system errors only. Thus, it should be noted that the main portion of the yaw path of the vessel basically will not be affected by any dynamic conditions. The only thing that has to be taken into account is that the dynamic conditions at the actual occasion permit a steady state yaw having the desired radius of path curvature. The above facts constitute the basic and characterizing difference between the present method of steering and known methods previously adapted or planned.

Although the kinematic method of steering outlined above implies improved navigation accuracy during the steady state phase of the path, disturbances of the above kind may possibly to affect the progress of the path during the initial phase thereof in an uncontrollable manner when the radius of path curvature decreases from infinite magnitude to the planned value. Therefore, it is of substantial importance to see to it that said disturbances (primarily the disturbances arising from variations in the dynamic characteristics of the vessel) affect as little as possible the initial path progress. In order to achieve this, it is generally desirable to make the initial phase of the path as reproducible as possible. One way of achieving this is to make the initial phase short by initiating the yaw at a relatively large rudder deflection. Immediately before the steady phase, i.e. when the radius of the initiated yaw, the value of which has been determined by instruments, approaches the set value of the radius of path curvature, the rudder deflection is decreased to the value determined by the follow-up obtained by the feedback system.

BRIEF DESCRIPTION OF THE DRAWINGS

The invention will be described below, reference being made to the accompanying drawings in which.

DETAILED DESCRIPTION OF THE PREFERRED EMBODIMENTS

Figure 1:
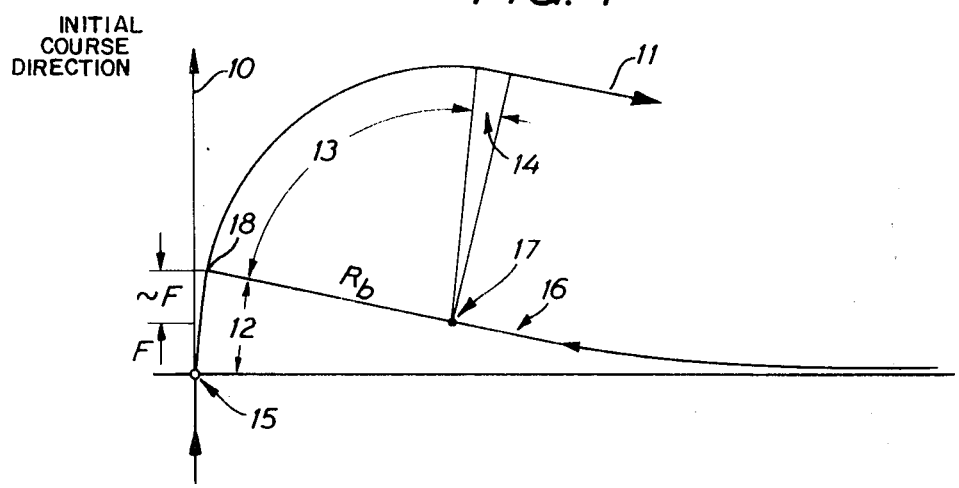
FIG. 1 represents the actual progress of a yaw of a vessel.

FIG. 1 illustrates the actual progress of events at the entrance to a yaw and at the exit therefrom whereby the course of the vessel will be changed from an actual course 10 to an exit course 11. This yaw which is presumed to have a constant radius of path curvature $R_b$ has an initial phase 12, a steady state phase 13 and a closing phase 14. However, due to the limited speed of the rudder control system of the vessel, the dynamic inertia of the vessel, etc., it is not possible, as was mentioned above, to obtain instantaneously from the actual course 10 a curvature of the path of the vessel corresponding to the desired value $R_b$.

The progress of events in the yaw can be described as follows. A pre-determined deflection of the rudder is initiated at a point 15, the point of setting. Thereafter, turning of the vessel about the yaw axis starts rather soon. In this way the vessel obtains an angle of attack (drift angle) which gives a lateral force and in due time also a movement directed inwardly of the initiated turn. The center of curvature of the yaw path thus initiated describes a curve 16, the evolute, and by proper control of the rudder said curve will be abruptly terminated at a point 17 where the radius of curvature has reached the value $R_b$. From the moment of setting, the curvature center of the yaw path has moved the distance F in the original direction of movement of the vessel. The tangent of the end point 17 of the evolute is directed towards point 18 of the path of the yaw where the radius of path curvature has reached its constant final value $R_b$. Said point 18 is spaced aproximately the distance 2F from the point of setting 15.

Generally, after having moved the distance F from the point of setting 15 the vessel has been displaced transversely from the original actual course line 10 a quite insignificant distance. According to FIG. 2 it is therefore possible to create a simplified (and for most practical cases approximately correct) model of the yaw by prescribing that the steady state phase 13' of the yaw, having the given value of radius $R_b$, starts right after the displacement F of the vessel from the point of setting 15'. This highly simplifies the procedure of planning and carrying out yaws. Generally, the approximation implies that the vessel continues to travel along a straight length F in the original direction in spite of the rudder deflection. Then, a yaw having the radius $R_b$ starts immediately without any intermediate smooth transition.

Figure 3:
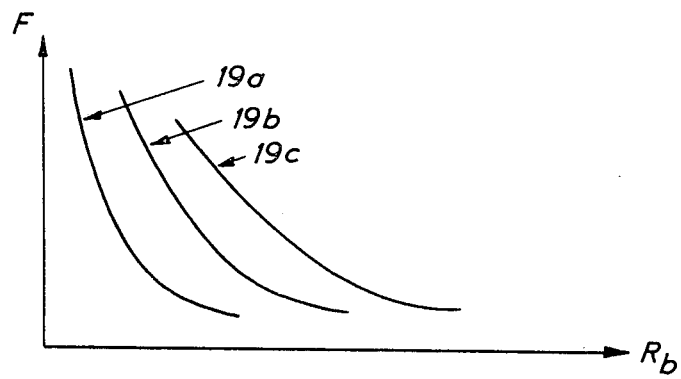
FIG. 3 represents an illustrative parameter dependence of the so-called leading distance F.

Thus, for carrying out a desired yaw, the curvature of which starts at a definite point along the original actual course line 10', the rudder deflection has to be initiated at the point of setting 15' a certain distance F in advance of said definite point. This distance F is hereafter referred to as the "leading distance" and depends primarily on the dynamic characteristics of the vessel, the magnitude of the desired yaw radius and the character of the program chosen for the rudder deflection during the initial phase of the yaw. The speed at the entrance of the yaw can also affect the magnitude of F. If the initial phase 12' is provided with rudder deflections of different fixed magnitudes, the parameter dependence of the leading distance F can assume for instance the character shown in FIG. 3 where the radius of yaw $R_b$ is defined by the horizontal axis and the leading distance F is defined by the vertical axis, where the curve 19a relates to a large rudder deflection, the curve 19b to an intermediate rudder deflection and the curve 19c to a small rudder deflection. By selecting rather large, fixed rudder deflections during the initial phase 12' small and relatively reproducible F-values can be obtained. It has been found that for vessels of the deplacement type the leading distance F is on about the same order as the length of the vessel.

There are several methods of determining and introducing the leading distance F. In simple cases the distance F can be a distance which the officers of the vessel have estimated and introduced by experience. For determining F, a diagram having important parameters such as entrance values and made up for each type of vessel can also be used. In more advanced cases, F can be determined automatically by computer facilities.

An alternative to the use of fixed rudder displacements during the initial phase for obtaining a reproducible value of F is to introduce a predetermined program for decreasing the yaw radius from an infinite value to the value that characterizes the beginning of the steady state phase 13' by utilizing control techniques. Another alternative is to control the angular rate of the vessel or the path thereof so that the vessel follows the given program during the initial phase 12. A feature common to all methods of decreasing the yaw radius from infinite value to the desired steady state value $R_b$ is that the varying dynamic characteristics of the vessel can be recognized as simply rather insignificant variations of the leading distance F.

For the same reason that an initial yaw phase must precede the steady state phase of the yaw path, a closing phase 14' of the yaw path also has to be considered. During the closing phase 14' the yaw radius has to increase as fast as possible from the steady state value $R_b$ to an infinite magnitude (straight course).

At the end of the closing phase 14' of the yaw, the path of the vessel should be stabilized on the new exit course 11'. As in the initial phase 12' path errors arising from disturbances of the same kind as previously mentioned must be considered. However, since the closing phase 14' is very short, path errors caused by such disturbances will always be practically negligible.

From the foregoing it may be appreciated that, according to the outlined kinematic method of steering, effective path maintenance of a vessel in a yaw may be realized. Therefore, it may be expected that at the exit of the yaw considerably less lateral path error will result than according to previous methods of steering. Thus, the maneuvering space or the path correction distance which has been necessary so far in advance of the passage of a gate can be made considerably shorter according to the new method of steering. This, in turn, permits the yaw radius to be selected almost as large as is allowed by the obstacle situation, for instance the bottom topography. This means considerable progress towards the objects set out above, i.e. improved navigation safety, decrease in loss of speed, and improved passenger comfort.

A basic idea of the present invention is the use of a premade kinematic model of the yaw procedure of a vessel. The parameters in the assigned model are determined in a path model defining device which can be of substantially two different types. As previously mentioned, in simple cases the path model defining device comprises a chart or a map inclusive of auxiliary means such as calipers, yaw lay-outs, etc. In more advanced cases a display unit, which for instance can be a radar indicator of the PPI-type, is used.

Figure 2:
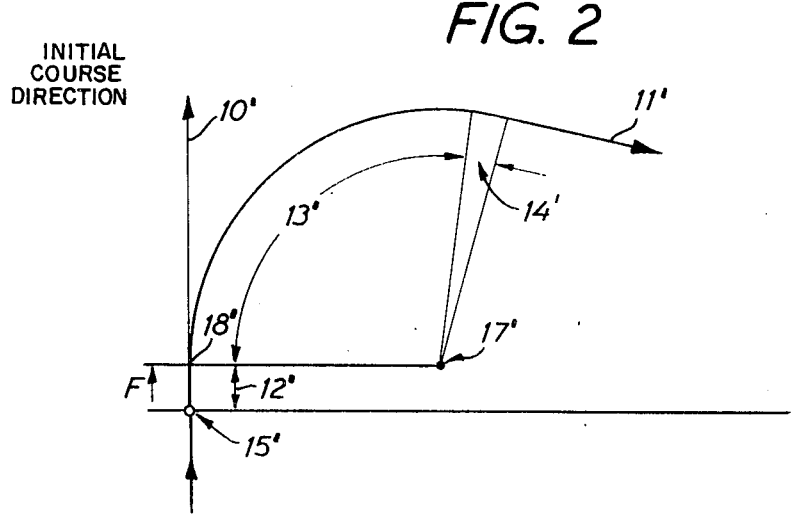
FIG. 2 represents an assigned, approximately correct model of a yaw.

The basic form of the path model has been indicated briefly above in connection with FIG. 2. Usually the path model is always more or less tangibly presented within an image of the surroundings of the vessel, for instance on a chart or a radar image. Generally, the path model comprises five path portions, viz., the actual course 10' before the setting of the yaw at point 15', which can be regarded here as given from the beginning, the initial phase 12' which is an extension of the distance F along the actual course line 10' as measured from the point of setting 15', the curved steady state phase 13', the closing phase 14' which is usually short, and the exit course line 11' after the yaw, which sometimes is given from the beginning.

It is assumed that the instantaneous position of the vessel in any of the path portions of the model either is given or can be pointed out. Moreover, it is not necessary that the model includes the above progress of events in their entirety. Sometimes, only portions thereof need to be utilized.

Geometrically, the model substantially implies that a preferred passage should be found which starts from the actual course line 10' at a suitable position and which merges, after the yaw, into the exit course 11'. Summarizing, it can be said that the geometric parameters of the path model should be so adapted that, in a desired manner, the model provides geometrically a passage which does not interfere with bottom topographic obstacles or other obstacles and which connects the actual course line 10' to the exit course line 11'.

The model adapted geometrically-geopraphically in the manner described above gives information on the geometry of an approaching or pending yaw. Hereinafter the conditions during the curved steady-state path phase 13' of the yaw will be considered first in more detail.

One of the more essential tasks of the yaw path model is to create conditions for determining one or alternatively several control parameters, i.e. set values, by which it is possible to steer the vessel along the yaw path prescribed by the model.

Here it is most convenient to select as a control parameter radius of curvature $R_b$, which also can be represented by the curvature measure $R_b^{-1}$ equivalent thereto, of the curved portion 13' of the yaw path model according to FIG. 2, or alternatively the path angular rate that will be prescribed by the path model in view of the speed of the vessel in the path. By path angular rate is meant the angular rate of the tangent to the path of the vessel which follows the vessel during the yaw which, due to possible variations in the angle of attack or drift angle of the vessel, does not necessarily coincide with the angular rate of the hull.

The set value $R_b$ is determined directly and geometrically from the model. Using the general kinematic relation $$V = R \cdot \omega$$

where V is the speed in the path and denotes the path speed of the vessel over ground, R is the instantaneous radius of path curvature and $\omega$ is the instantaneous path angular rate, the set value $\omega_b$ of the path angular rate can be determined by the relation $\omega_b = V/R_b$.

In order to obtain control signals which can be used as a basis for carrying out a desired yaw of the vessel, the corresponding actual values valid for the movement of the vessel during the yaw also have to be determined. The actual value of the instantaneous radius of path curvature of the vessel, $R_a$, is determined by using the general kinematic relation given above, according to the relation $$R_a = V/\omega_a,$$

where $\omega_a$ denotes the instantaneous path angular speed determined by instrument facilities aboard the vessel. If the narrowness of the pending yaw is expressed as path curvature $R^{-1}$, the following relation will be obtained $$R_a^{-1} = \omega_a/V$$

In order to steer the ship so that it realizes the yaw determined by the path model, known control techniques are applied. Several control alternatives are available for example as follows I. The difference quantity $R_b - R_a$ is generated and supplied as an input quantity, i.e., control signal, to a steering indicator or to the rudder control system of the vessel, the rudder deflections obtained thereby manually or automatically minimizing the control signal. The result thereof will be that $R_a$ equals $R_b$.

If the signal for steering of the vessel is generated as the difference between the set and actual values of the path curvature $R_b^{-1}$ and $R_a^{-1}$, respectively, there will be obtained a control signal according to the relation $$R_b^{-1} - R_a^{-1} = \frac{R_a - R_b}{R_b \cdot R_a}$$

Disregarding the reversed presign, this control signal is operationally equivalent to the more direct control signal $R_b - R_a$ during the steady state phase 13 of the yaw. Since $R_a$, during the steady state phase, is closely equal to $R_b$, the denominator term $R_b R_a$ implies a constant scaling of the control signal only.

II. The difference quantity $\omega_b - \omega_a$ is generated and supplied as an input quantity, i.e., control signal, to a steering indicator or to the rudder control system of the vessel, the rudder deflection obtained manually or automatically minimizing the control signal. As a result thereof $\omega_a$ equals $\omega_b$ and, therefore, $R_a$ equals $R_b$.

III. A suitably built-up function $f(R_b - R_a, \omega_b - \omega_a)$ is generated from the difference quantities $R_b - R_a$ and $\omega_b - \omega_a$ and, then, the signal representing the functional value is supplied as an input quantity, i.e., control signal, to a steering indicator or to the rudder control system of the vessel, the rudder deflection obtained thereby manually or automatically minimizing the control signal. The result thereof is that $R_a$ equals $R_b$ and $\omega_a$ equals $\omega_b$.

As far as the control techniques are concerned, the last mentioned control alternative III is supposed to provide, in certain cases, a more favorable transition to a steady state condition than the other control alternatives.

Two alternatives are most convenient regarding the realization of the control functions which shall bring the vessel to follow the yaw determined by the model. Either a helmsman may obtain, in a suitable manner, information on the steering quantities, and, according to these steering quantities as well as given rules and/or his own experience, he will steer the vessel by hand so that the prevailing actual value and the set value coincide, or the control signal $(R_b - R_a, R_b^{-1} - R_a^{-1}, \omega_b - \omega_a$ or $f(R_b - R_a, \omega_b - \omega_a))$ may be supplied to an automatic steering device which provides a change of the rudder deflection such that the control signal will be minimized. Both alternative methods will be described in more detail below, first with reference to FIG. 4.

According to the present invention, the yaw model is selected such that the yaw procedure can be controlled without knowledge or consideration of a great number of vessel parameters. It should be appreciated that a great difference exists between the kinematic control of a yaw starting from a geometric yaw model as in the present invention, and the control of the yaw starting from a steering-dynamic prediction of a future position of a vessel, based on the actual position of the vessel and the state of movement, different vessel parameters and different situation parameters (drift, wind situation, etc.) being known.

Basically, the yaw model according to present invention substantially comprises only one quantity representative of the vessel parameters, viz. a leading distance F which is dependent on the type of vessel, the size of vessel and the program or rudder setting when initiating the yaw. In connection with displacement vessels, F is substantially independent of the speed. As mentioned above, the leading distance F can be determined either by experience, by means of a diagram or by auxiliary calculation means (computer facilities).

Figure 4:
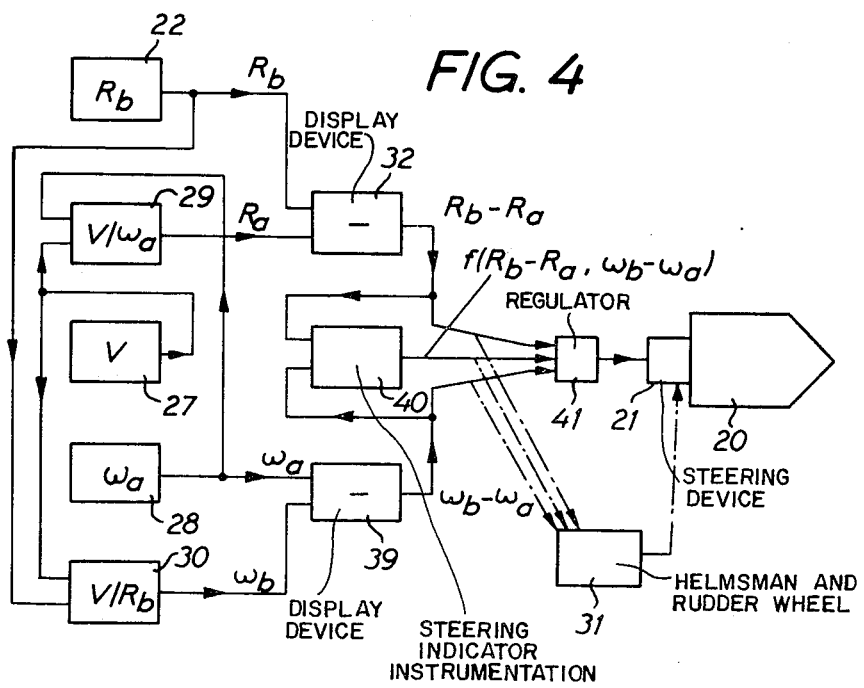
FIG. 4 represents an illustrative basic block diagram of the device according to a preferred embodiment of the invention.

In FIG. 4 there is shown a basic block diagram of a preferred means involved in the path steering procedures described above. 20 represents the vessel which is to be controlled to follow the path and which is provided with a rudder control system 21 (steering device). 22 refers to path model defining means which, as mentioned above, may comprise chart facilities or a display unit.

If means 22 comprises a chart or other map picture equivalent therewith there is selected primarily the radius $R_b$ of the intended yaw curve as a control quantity. Some routines for using calipers and specifically designed yaw lay-outs are well-known among navigators for performance of estimated yaws (based on experience). If a caliper is used, a suitable position may be chosen initially on the chart for the initiation of the path curvature (18' in FIG. 2). Moreover, there must be chosen in connection therewith a yaw center position on the chart as a turning point for the caliper (17' in FIG. 2). When navigating according to the invention it is also necessary to introduce a leading distance F and this is calculated in reverse along the actual course line (10' in FIG. 2) from the position 18' at which the path curvature is initiated. The point of setting (15' in FIG. 2) where the rudder deflection shall be started is thereby obtained on the chart.

Figure 5:
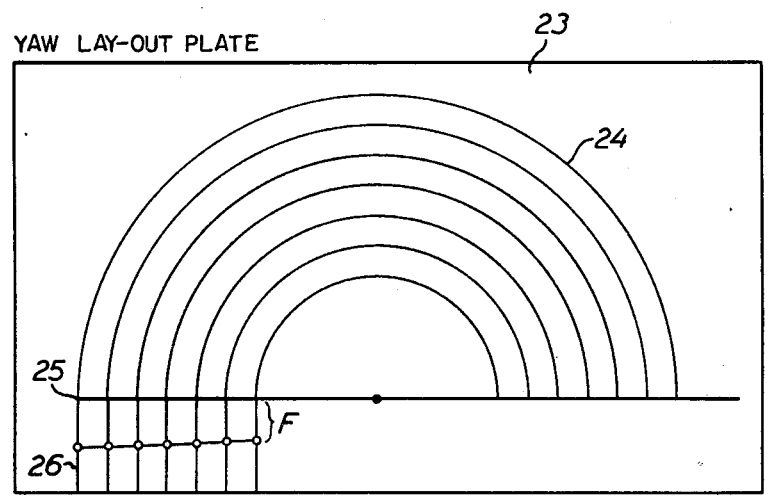
FIG. 5 represents an illustrative yaw lay-out.

Also a yaw lay-out may be used. By yaw lay-out is meant e.g. a transparent plate 23 in FIG. 5 on which there is provided a set of yaw circle curves 24 having a suitable difference in radius. Each curve represents a given $R_b$-value. By displacing and turning the lay-out over a chart it is easy to select the yaw circle curve (or an intermediate position between two curves) which provides the best geometrical matching to the path which is favorable to follow. In this case, it is not necessary to select, in a separate step, a yaw center. This method may save time and thereby make the procedure simpler. For the rest, the yaw center position is of less interest in following a yaw. To the points 25 on the yaw lay-out where a yaw curve starts, straight routes 26 may be connected corresponding to the actual leading distance F. This facilitates the locating of the point of setting on the chart.

When the yaw radius has been determined, the set value of the yaw rate $\omega_b = V/R_b$ may also be determined on the chart as a control parameter for performing the yaw. If the speed V of the vessel varies considerably during the yaw, special technical facilities should be used for the determination of $\omega_b$, as will be described below.

Performing a yaw by means of a set value of a steering quantity in the manner set forth above provides an open yaw control, i.e., a yaw control without feedback, contrary to the conditions prevailing when one steers in a yaw utilizing a display unit. The navigation precision in open yaw control is dependent upon the accuracy is determining, by observations, the position of the point of setting and also of the operating accuracy of the instrument facilities utilized.

An alternative to use of the chart described above is use of a display unit in which all path portions of the model are generated by particular means in a way described in more detail below. In this case the leading distance F is introduced as a path portion representing the previously defined initial phase (12' in FIG. 2). In this way, the point of setting (15' in FIG. 2) is given a well defined position in relation to the curved path portion (13' in FIG. 2) and thus in relation to the gate to be passed. The position of the vessel in the path model being known, the initiating rudder deflection can be carried out without direct observation of chosen sight marks in the surroundings of the vessel.

As soon as the vessel has passed, during a yaw, the point of setting, a "counting down" of the leading distance F is started. Thus, during the period when the vessel passes through the initial phase there is supplied to the path model over calculation facilities a decreasing leading distance F', for instance according to the relation $$F' = F - V \cdot t$$

where $t$ is the elapsed time.

As the vessel passes through the curved steady state yaw path portion (13' in FIG. 2), a similar counting down is carried out which maintains in a correct way the remaining path model portion of the image presentation not yet passed.

If disturbances of any kind have moved the vessel from the path prescribed by the model, this will be recognized by the remaining portion of the path model as no longer passing through the gate through which it was laid initially. In this event, there will be introduced into the path curvature of the path model a corrective measure such that the path model will again pass through the actual gate. If the correction is large, said measure has the same character as an initiation of a new yaw having a different set value. This may require the introduction of a new shorter leading distance F'' of the form $$F_k = f(\omega_a, \omega_b); \; [\text{alt. } g(R_a, R_b)]$$

where $f(\omega_a, \omega_b)$ is a function which equals the value zero for $\omega_a/\omega_b = 1$ and equals the value $F_k$ when the quotient $\omega_a/\omega_b$ equals zero.

For intermediate values of the quotient, function $f(\omega_a, \omega_b)$ is given values which correspond roughly to the yaw dynamic characteristics of the vessel. Analog conditions are valid for $g(R_a, R_b)$.

The outlined method of carrying out corrections of already occurred path errors over the display unit can be regarded as a feedback supporting and stabilizing process in the control procedure. For this reason, it is possible to correct in a simple way path errors which are due, for instance, to the fact that a somewhat incorrect value of the leading distance F has been chosen and introduced. If extreme consequences are drawn therefrom, a total elimination of the leading distance F could be imagined. The number of parameters of the model, dependent on the vessel, thereby will be reduced to zero.

The system according to FIG. 4 also comprises instrument facilities carried by the vessel such as transducers, calculating facilities, etc., which are needed for supplying (in addition to $R_b$ which is determined by means of the path model defining means 22) the necessary control quantities $\omega_b$, $\omega_a$ and $R_a$ for the steering of the vessel. The design of the actual instrumentation and the mode of operation thereof are not essential for the realization of the inventive idea. However, a summary of general characteristics can be helpful for the evaluation of different control alternatives in various practical applications.

Primarily, two path parameters are of interest, viz. the path velocity V over ground and the path angular rate $\omega_a$.

Figure 6:
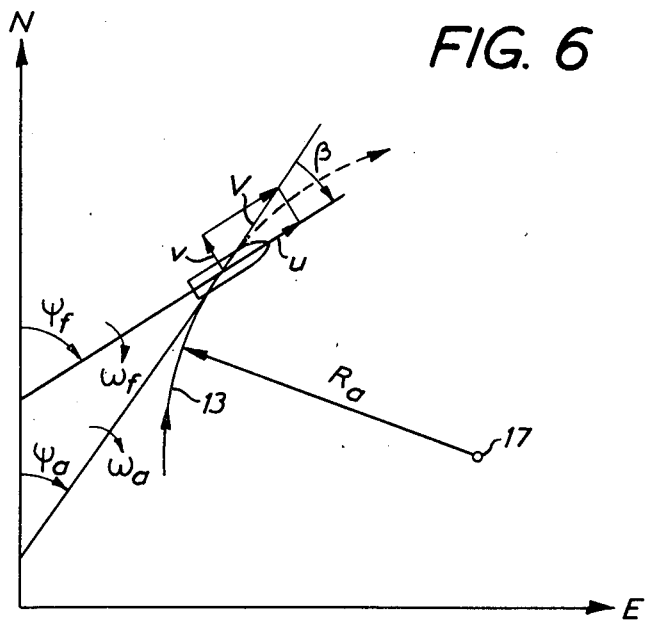
FIG. 6 represents geometric relations in a yaw.

For the determination of V there are means 27 generally comprising a log or a log system. As to quality and performance, logs can be of very different kinds. In logs of any kind, a fundamental problem is that the vessel very frequently (and particularly in yaws) moves under a considerable drift angle or angle of attack ($\beta$), as shown in FIG. 6. In said figure, which shows a coordinate system wherein the horizontal axis is assumed to be the East direction and is marked E and the vertical axis is assumed to be the North direction and is marked N, the yaw path of the vessel is designated 13 and the yaw center thereof 17 as in FIG. 1. The following symbols represent.

$\psi_a$ — the course angle for the path of the vessel in the position thereof shown in FIG. 6

$\psi_f$ — the course angle of the longitudinal direction of the vessel (stem course)

$\omega_a = \dot{\psi}_a$ — path angular rate (in the position of the vessel)

$\omega_f = \dot{\psi}_f$ — turning rate of the hull (yaw angle rate)

$R_a = V/\omega_a$ — path curvature radius of the path of the vessel $u$ — the longitudinal speed of the vessel over ground $v$ — the transverse speed of the vessel over ground $V$ — the path speed of the vessel over ground (the sum of the speed vectors) $u$ and $v$ $\beta$ — the drift angle or angle of attack of the vessel The path speed V over ground is determined most accurately by means of a two component log which is e.g. of the doppler type. Such a log system measures against the sea bottom or alternatively against a deep, hopefully stationary water layer. Then, an almost correct value of V is obtained according to $$V = \sqrt{u^2 + v^2}$$

Normally, this calculation requires auxiliary calculating means of some kind, for instance a computer. p For economic reasons, single component logs, which measure the speed in the longitudinal direction of the vessel only, i.e. the $u$ component, are presently the dominant type. If the log is of the doppler type and measures against the bottom it is possible (if called for by accuracy requirements) to carry out a correcting calculation according to $$V = u/\cos\beta$$

If there is no information on $v$, an estimation of $\beta$ can be resorted to. During a yaw, a common value of $\beta$ falls within the angular range of 5° to 10°. If no correction is made, errors in V thus can be somewhat more than 1%. However, for many practical applications an error of such magnitude is acceptable. An approximate value of $\beta$ often can be derived from the computer circuits of the display unit in a manner to be described later.

The conditions are more favorable if single component logs are used which measure only the longitudinal speed of the vessel relative the surrounding water. The pressure log is the most common log of this kind. The measuring principle of said log does not inherently allow particularly good accuracy. The errors are also magnified due to the fact that a moving surface water layer can give the vessel considerable additional speed over ground. Of course, if it is necessary, a continuous calculation of the correction can be made after estimation of the speed vector of the surface water layer. However, for this calculation, auxiliary means are required and such means frequently can be more complex and expensive than is desired. In the most unfavorable case a failing correction may provide an error in V of the order of approximatively 3%. However, for several navigational purposes, the path errors obtained for said reason still may imply that the present method of navigation results in a considerable improvement. If a display unit is used for controlling and monitoring the yaw procedure a feed back is obtained, as previously mentioned, and this makes it possible to operate, without major drawbacks, with errors in V which are not otherwise negligible.

For determining $\omega_a$ there are means 28 and in this case it is most convenient to use auxiliary gyro means. However, a certain precaution must be taken. The correct value of $\omega_a$ is determined according to FIG. 6 from the relation $$\omega_a = \omega_f - \dot{\beta}$$

The angular rate $\omega_f$ of the hull of the vessel is determined either by differentiating the gyro compass signal or by a more direct measurement by means of a yaw angle rate gyro fixed to the hull.

If the method of navigation requires a more correct value of $\omega_a$, a continuous calculation of $\beta$ has to be carried out. FIG. 6 shows that $$\dot{\beta} = \frac{d}{dt}(\text{arctg } \nu/\mu)$$

This calculation of $\dot{\beta}$ requires not only calculation means but also a two component log. If no log of this type is available, the possibilities of determining fully reliable values of $\dot{\beta}$ are generally less favorable.

As a favorable condition, it can be mentioned that $\dot{\beta}$ during the major portion of the steady state phase is relatively small. Then, the vessel is in a steady state turn having an approximately constant angle of attack. The change of the angle of attack provides substantial contributions only during the initial phase, where as mentioned previously, other methods are resorted to during obtaining good accuracy of the navigation. However, due to the change of speed in narrow yaws, a minor change of rate of attack $\dot{\beta}$ can also occur during the steady state phase. In many cases, the errors introduced by disregarding $\dot{\beta}$ can be considered as errors of minor importance and, therefore, not very essential for the overall precision of the navigation. Thus, in this case, the rate gyro indication $\dot{\psi}_f$ is used as a substitute for $\dot{\psi}_a$.

Alternatively, the navigation parameters V and $\omega_a$ could also be determined by facilities other than logs and gyros. V as well as $\omega_a$ can be derived by means of one or more measuring sensors aboard the vessel which more or less continuously determine the distance and direction of distinguishable fixed points in the surroundings of the vessel. However, a computer capacity (which cannot be neglected) is needed for such a purpose. The method also requires rather good signal quality. It means that such a method has not yet been publicly used. For determining the quantities $R_a = V/\omega_a$ (alternatively $R_a^{-1} = \omega_a/V$ and $\omega_b = V/R_b$) quotient generating means or auxiliary calculation means of a known kinds are needed, and such means have been denoted by reference numerals 29 and 30, respectively, in FIG. 4. The calculations can be carried out either in separate units (operating in an analog or digital way) or can be executed as sub-processes in a computer.

Some embodiments of the indication and display means for presenting to the helmsman the set values and actual values obtained will now be described. Said auxiliary means should preferably be placed immediately ahead of the helmsman close to the rudder wheel. When the helmsman steers the vessel in accordance with the control quantities obtained therefrom, the vessel will realize the path determined by the path model in means 22.

First it is assumed that the helmsman operates the rudder wheel in the conventional way, the actuation of which (either directly or through a rudder machinery system) provides a rudder deflection. In FIG. 4 the helmsman and the rudder wheel are indicated diagramatically by a block 31 from which is extended a dash-and-dot line to the rudder operating system 21 in order to indicate that the latter will be actuated by the helmsman's operation of the rudder wheel. The conditions that define the rudder deflection in terms of the wheel deflection need not be prescribed in this connection. As previously described, three alternatives of control denoted I, II and III have been defined.

In the control alternative I the control quantities of the yaw procedure are represented by the desired (selected) radius of path curvature $R_b$ and the actual radius of path curvature $R_a$. The display or indicator device that visualizes $R_b$ and $R_a$ is indicated in FIG. 4 at 32, and a dash-and-dot line to block 31 indicates that such device is read by the helmsman. The display or indicator device 32 can be of several different embodiments. In the first place, it is possible to distinguish between a purely digital and a purely analog way of presentation. The pure digital way of presentation seems to be less suitable in this connection. Two digital values have to be read and the difference thereof (positive or negative) has to be formed. This procedure has a low degree of perspicuity which implies a relatively slow conception and execution. In other words, the ergonomic adaption is low. However, as will be shown hereinafter, combinations of digital and analog presentations are possible alternatives.

Figures 7, 8, 9:
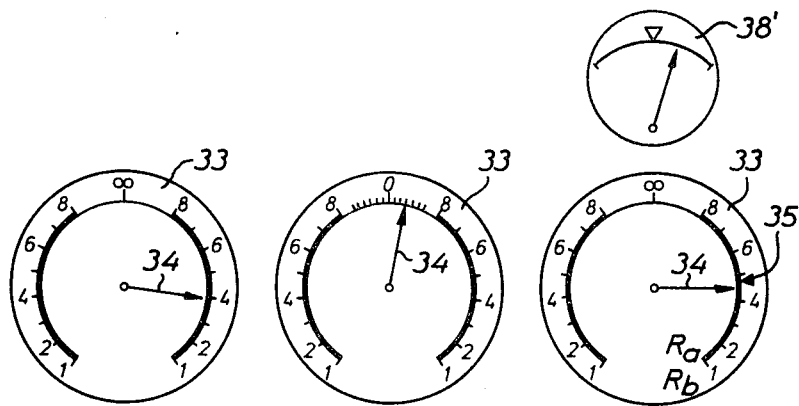
FIG. 7 – 9 represent illustrative devices having a circular scale for presenting yaw radii.

FIG. 7 illustrates a simple analog arrangement where $R_b$ and $R_a$ are represented by a round scale device 33 calibrated in yaw radius, for instance in units of cable lengths (185 m). For ergonomic reasons (in this case the coupling between starboard and right, port and left, respectively) starboard yaws are presented at the right and port yaws at the left on the scale device. The magnitude of the control quantity $R_a$ is indicated by a pointer 34 or the like. In the simplest case, the $R_b$-value is presented orally to the helmsman, for instance "starboard 4 cable lengths". When executing the steering order, the helmsman looks hard at the 4 cable lengths scale division and turns the rudder until the pointer mark for the $R_a$-value stops at said scale division. In this connection, the ergonomic conditions moreover prescribe that turning of the rudder wheel towards the right (change of course towards starboard) shall result in an actual value indication having a movement towards the right. In the same way, a rudder wheel movement towards the left (change of course towards the port side) shall provide an indication of movement towards the left. This means that the scale shall present increasing radius values inwards towards the mid-position (straight upwards) which position corresponds to a straight course. At the extreme positions of the scale, successively smaller, narrower, yaw radius values are indicated.

Instead of being calibrated in yaw radius or path curvature radius, the scale can also be calibrated in the inverse measure path curvature. This measure can either be the inverse value of the radius of path curvature, or a normalized dimensionless measure determined by the quotient of, for instance, the length of the vessel and the radius of path curvature. In this case the calibration of the scale will have high figures at the outer portions of the scale and small figures at the inner portions of the scale. As to the rest, the indication and the method of steering are unchanged.

For a certain type of vessel or a certain size of a vessel it is frequently of interest to use only controlled yaws having radii within a given range. For radii of path curvature larger than the maximum radius used, it can be a measure of convenience to arrange, according to the principles shown in FIG. 8, automatic switching of the instrument in such a way that the instrument indicates the angular rate of the vessel or the path thereof. This can facilitate the ability of the helmsman to steer on a straight course.

Figures 10, 11:
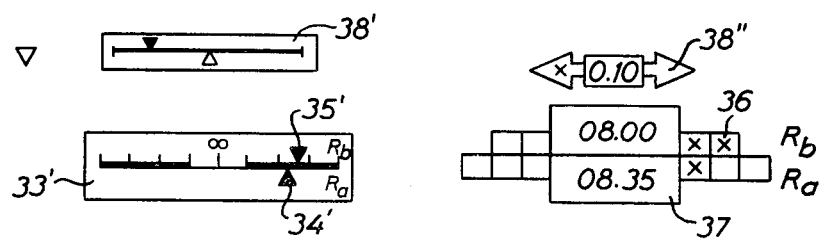
FIG. 10 represents an illustrative device having a linear scale for presenting yaw radii.
FIG. 11 represents an illustrative hybrid digital-analog presentation of yaw radii.

As an aid to the helmsman in remembering the orally presented $R_b$-value, it may be suitable, according to the principle illustrated in FIG. 9, to co-present the $R_b$-value on the scale, for instance in the form of a moveable "runner" or a second instrument pointer 35. This arrangement may be most suitable in cases where the path model defining unit is a display unit having control means for setting the actual value of the radius of path curvature. In FIG. 9 there are illustrated the conditions in a starboard yaw. At the particular instant shown, $R_a < R_b$ which means (if the rate of change is small) that the rudder deflection is somewhat too large. Then, the rudder wheel has to be turned leftwards (port) which implies that the $R_a$-indication moves leftwards (port). An alternative ergonomically favorable embodiment of the display device can be obtained if the circular scale is replaced by a linear scale preferably located horizontally. FIG. 10 illustrates an arrangement of this type corresponding to the arrangement shown in FIG. 9. The elements included in FIG. 10 have the same reference numerals as similar elements in FIG. 9 but with a prime mark added.

In the arrangements previously illustrated according to FIGS. 7 to 9 it is preferred to operate with common instruments of the pointer type. In an arrangement according to FIG. 10 it may also be preferred to use pointer type indicating means or the like as well as purely optical indicating means. The $R_a$-value can be presented by means of e.g., a light column (thermometer presentation) or by means of a light line. Light emitting diodes, liquid crystals and glow indicators are illustrative components suitable for indication of the kind desired. Stepwise as well as continuously operating devices can be used.

In several applications it may be of interest to indicate radii of path curvature with relatively high accuracy within a measuring range larger than one decade. Means and routines known per se are needed in such a case for varying the scale factor and the calibration of the indicating means, and if necessary can be combined with shifting between different measuring ranges.

In the embodiment according to FIG. 8 it is assumed as an alternative that a yaw angle rate indication has been provided in the range of minor interest where the radius of path curvature is larger than the maximum value used. The yaw rate indication can, of course, also be carried out by means of a separate instrument which could indicate the path speed or yaw angle rate also during the yaw phase proper in case this is of interest.

In several applications it may be desirable to combine a pure analog situation presentation as described above and a digital instrument for radius indication. Although the digital indication of the radius of path curvature is not advantageous ergonomically as far as the presentation of steering values during the follow up procedure is concerned, such indication is, however, faster and more accurate than the analog presentation as to informing the helmsman or other person in his vicinity regarding the magnitude of the actual radius of path curvature.

In FIG. 11 there is illustrated another effective and simple combination of an analog and digital presentation of the radius of path curvature, 36 and 37, respectively. Here the ergonomic function of the analog portion has been reduced to shifting between three distinct situation representations, realized for instance by means of light signals. In FIG. 11 light signals are represented by switched on lamps denoted by x. The situation shown informs the helmsman that $R_a > R_b$ (the set value of curvature is less than the actual value of curvature). Therefore, he should steer harder towards starboard (the right), i.e. in such a way that the intermediate $R_a$-lamp will be switched on.

In the alternative presentation according to FIGS. 9 and 10 the helmsman bases his steering maneuver mainly on his observation of the positional difference between the two pointer indications. For the rest, the position of the pointer indications along the scale is of minor interest to the helmsman. Since the pointer indications generally are very close to each other during a more or less dynamic follow up procedure, the possibility of making an accurate reading of the difference positions will be more difficult. For this reason, it may be preferred to introduce a "Δ-instrument" which presents the control signal $R_b - R_a$ in a magnified scale. As shown in FIGS. 9 and 10 the Δ-instrument is indicated by reference numerals 38 and 38', respectively, and can be located in juxtaposition to the $R_b$ and $R_a$ indicating devices.

In the case where a combined digital-analog presentation of the control quantities is applied according to FIG. 11 it may be preferred to introduce a Δ-indication. Basically, this can be arranged in several different ways; FIG. 11 illustrates one way, the Δ-indication being denoted by numeral 38".

In the control alternative II the control quantities $\omega_b$ and $\omega_a$ are used. Means for presentation and indication of these quantities are denoted by numeral 39 in FIG. 4, a dot-and-dash line to block 31 indicating also in this case that such means are read by the helmsman.

Generally, the same techniques as indicated in connection with FIGS. 7 to 11 can also be used in this case. An exception may be made for the alternative in FIGS. 7 and 8. Here it is presumed that the helmsman focusses on an orally presented set value of the control quantity, which may be rather difficult to carry out since $\omega_b$ frequently varies in magnitude due to a reduction in speed during a yaw.

In this case the character of the scale will be such that increasing values of $\omega_b$ and $\omega_a$ provide indication deflections increasing towards the right when starboard yaws are carried out and increasing towards the left when port yaws are carried out, in the same manner as when a curvature quantity is being used as the control quantity.

When the steering is carried out by using the angular rate as a control quantity there may be better reasons than indicated earlier to supplement the indication with a digital value of $R_b$ and/or $R_a$.

In order to further facilitate the work of the helmsman, it may be convenient for a more direct deflection of the rudder to replace the conventional rudder wheel by a maneuvering device — as to appearance it might well be shaped as rudder wheel — which by feed back introduced by servo systems operates to control the vessel or the path thereof at an angular rate determined by the deflected position of the maneuvering device (manual angular rate control instead of manual rudder deflection control).

This control alternative III which operates with a control signal which usually cannot be given a direct physical approach may appear somewhat strange for manual steering. However, a steering indicator instrumentation 40 basically can be built up in the same manner as described in connection with the control alternative II. As previously indicated such a control alternative might imply a follow up procedure which is more favorable than the two other control alternatives as far as the control technique applied is concerned.

In the manner shown in FIG. 4 there is connected to the rudder control system 21 a regulator 41 which receives and processes (converts in a suitable manner) the control signal from means 32, 39 and 40 before said signal is supplied to the rudder control system 21.

In the simplest case the regulator 41 may comprise some kind of conventional PID-regulator. The ID-section of the regulator is responsible for signal contributions of an integrating and differentiating character. By means of said signal contributions a control procedure can be suitably stabilized; basically according to the same intentions as when a helmsman by experience turns the rudder in manual steering in order to minimize the follow up error as soon as possible.

Although a vessel is equipped with auxiliary means for substantially automatic steering according to the description above, there are always important reasons for supplementing the equipment with means for manual steering. There should be provided supplementary equipment for manual steering not only as an alternative method of steering but also as a spare method of steering in particular cases. Indicating devices for the presentation primarily of $R_b$ and $R_a$ (in addition to the presentation of the situation that may be obtained e.g., from a radar indicator) can be of great help for the general supervision and check-up that is carried out by the staff at the bridge of the vessel. All the forms of presentation described above — analog, digital and hybrid — can be used in this connection.

In many cases, particularly when maneuvering large vessels, the dynamic characteristics of such vessel can be very unique. For instance, the equations that describe the characteristics can disclose pronounced non-linearities and the parameters of the equations can vary greatly with the environment, the state of movement, degree of loading, etc. For such reasons, there is frequently a need for varying the parameters of the regulator operation in dependence upon such changes.

The modern control techniques have indicated ways of dimensioning regulators which can adapt themselves to varying conditions of the system. Such adaptive regulators can also be made self-setting.

One circumstance, which is commonly known from different types of steering and control systems, is capable of adversely affecting the navigation result. During the steady state path of the yaw, where $R_a$ is approximately of the same value as $R_b$, a number of disturbances have to be taken into consideration which are usually determined statistically, such as noise in the used measuring signals (e.g. due to rough sea), lack of attention or low skill of a helmsman, or the like. $R_a$ will thereby perform, in a yaw, dynamically dependent, randomly variating oscillations about $R_b$. It has resulted that, when making yaws of relatively small radii, there is a good basis for limiting the follow up errors, e.g., represented by the difference between the values $R_b$ and $R_a$ presented to a helmsman, to a relatively low level. This means that the error, if any, in the average value of the indicated radius of the yaw $R_a$ (and thus the radius of curvature of the yaw being performed by the vessel) usually will be of a negligible magnitude. However, in yaws having a relatively large yaw radius, the speed of response of the system will be impaired. The follow up errors will be enlarged in that case and the times for deviation from the correct value will be extended. The frequency of the corrected rudder movements will therefore be decreased, which means that steering difficulties increase and the stability of the system will be impaired. Troubles of this kind are encountered in manual as well as automatic steering. Especially in manual steering the helmsman's feeling for the average value about which the indicated yaw radius $R_a$ oscillates during an actual interval of the yaw will be impaired.

During manual steering in yaws of constant or nearly constant speed, errors may be compensated for in an easy way by initially generating, by means of auxiliary instruments, an actual error signal as a measure of the quantity $$\int (R_b - R_a) \, dt$$

during a selected actual portion of the path, where T is passing time.

If the speed of the vessel varies in the yaw, a more correct measure of the error integral will be obtained if the integration is performed with respect to the distance covered. In this case the error integral will have the form $$\int (R_b - R_a) \, ds \text{ or } \int (R_b - R_a) \, V dt$$

Where V is the speed of the vessel and s is the distance being covered.

Depending upon the character of the steering procedure, the actual error integral may be given the more generic form $$f(R_b, R_a, V, t)$$

e.g., according to any of the error relationships $$\int (R_b - R_a) \, V^n dt \text{ or } \int \ldots \int (R_b - R_a) \, V^n dt^m$$

where $n$ is a selectable weighing constant and $m$ is a selectable integral number.

The generation of the actual error function may be started e.g., at the beginning of the steady state phase of the yaw, and the signal is presented (possibly after having exceeded a given threshold value) in a suitable form for the helmsman. He observes the sign of the signal, perhaps also the magnitude of the signal, and effectuates in accordance therewith such rudder movements as provide greater and/or more prolonged steering deviations $R_b - R_a$ in the direction that minimizes said error function.

The presentation of the actual error function to the helmsman can be made in several alternative manners and some examples will be given. A simple manner is to give both of the values $R_b$ and $R_a$ presented to the helmsman a "false" addition as a measure of the error function. This makes the helmsman attach greater importance to rudder deflections which minimize the error function, without the need for thinking over the causal connection in the maneuver. The scale which is selected for the error addition must not be too large because the control stability of the system otherwise may be impaired. For a helmsman this embodiment of the steering system advantageously involves no mental load in the form of e.g., extended and/or more complicated rules for steering.

Another alternative for the presentation comprises presenting the error function separately to the helmsman. Several methods can be applied. Optical and/or acoustic auxiliaries may offer the greatest advantages. The sign of the error function may be tied e.g. to the signal character or to the place on the presentation board where the signal is transmitted. Also, an error or the like arranged in a suitable manner on the presentation board can give the desired information. In case it is desired to indicate the magnitude of the error function, analog as well as pulsed (e.g. digital) methods may be used.

In automatic steering, when the yaw radius is being used as a control quantity, the conditions for a good navigation result are considerably better, although the conditions as far as the control technique is concerned are substantially the same as in manual steering. If the servo circuit elements which are included in the system operate linearly or approximately linearly, it may be appreciated that an average value of $R_a$ (as measured over an actual interval of the yaw) closely follows $R_b$, as well as in yaws having a rather large radius. However, if the servo circuit elements operate nonlinearly, the average value of $R_a$ may be subject to variations or a slow deviation, which is not desired, primarily when yaws having a relatively large radius are being performed. In this case it is also possible to add to the proper steering signal representing $R_b - R_a$ a signal component which, in a suitable scale, is a measure of said error function. In many control systems there is often generated by means of an existing PID-regulator a similar error signal of such a character that a non-weighted error integral component ($n = 0, m = 1$) is added to the steering signal.

In the automatic steering operation there may preferably also be included some operations that are concerned with the shifting between the three different path phases mentioned above; i.e., the initial phase, the steady state phase and the closing phase. For this purpose it is necessary to execute a number of logical operations (state changes). Such, operations will depend on a number of factors of the system, the type of which cannot be specified until the application has been defined and specified. In connection with FIGS. 26 to 30 examples will be given of the basic features of some possible alternatives for instrumentation. However, the path model defining means constructed as a display unit for determining the set values of yaws and for monitoring the performance of yaws will first be described with reference to FIG. 12.

Figure 12:
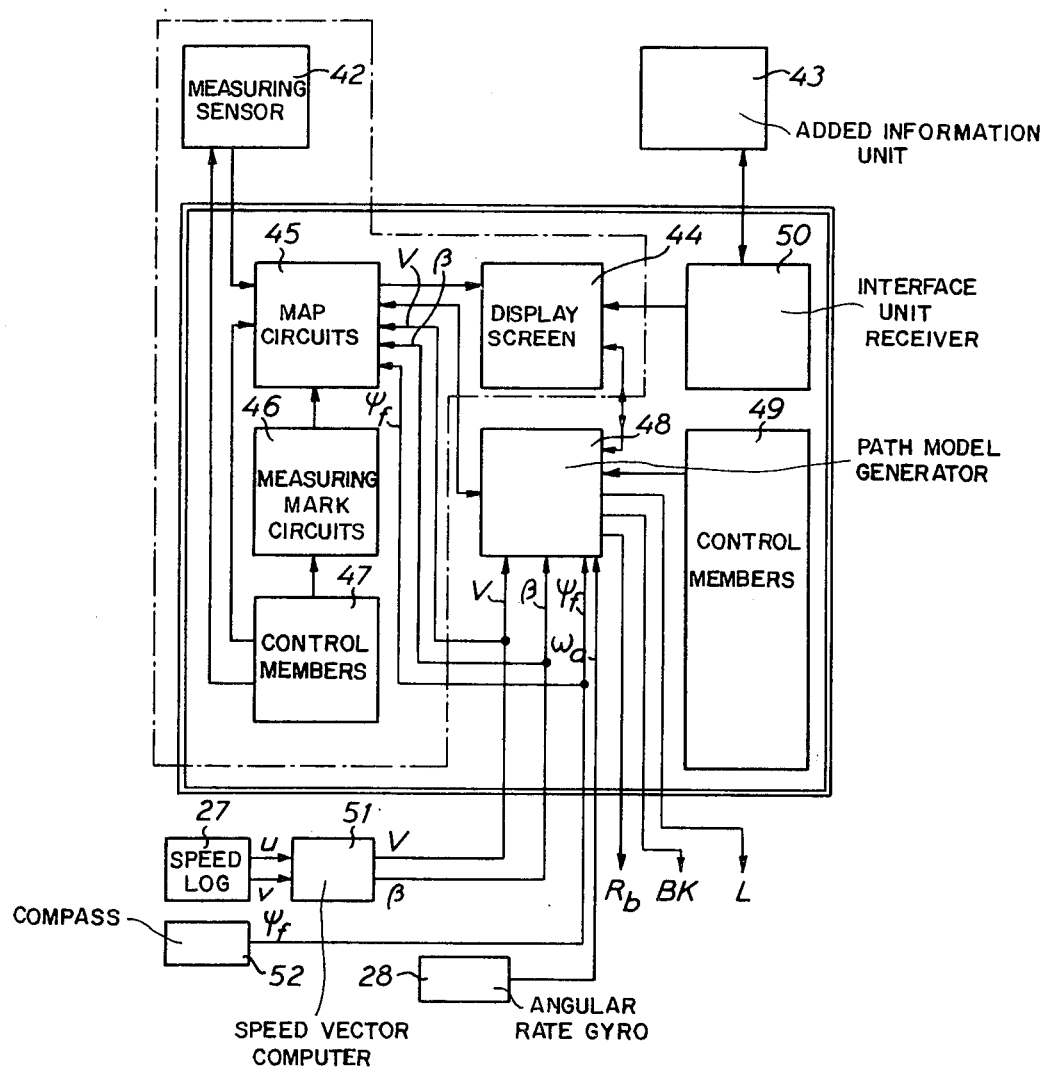
FIG. 12 represents an illustrative block diagram of a path model defining display unit.

The display unit which can be for instance a radar indicator of the PPI-type having certain additional functions stated below, is connected (slaved) to one or several measuring sensors 42. An example of a measuring sensor is a navigation radar equipment. The display unit can also be connected to a unit 43 for certain additional information. Referring to FIG. 12 the display unit comprises the following sub-devices, viz. a display screen 44, map circuits 45, measuring mark circuits 46, different control members, denoted collectively 47, path model generating means 48, control members for said latter means, collectively denoted 49, and receiving means 50 (interface) for additional information from unit 43. To the path model generating component 48 there are conncted means for supplying the quantities V and $\beta$, viz. a speed log 27 and a speed vector computer 51, a compass 52 for supplying the quantity $\psi_f$ and an angular rate gyro 28 for supplying the quantity $\omega_a$.

Map circuits 45 may comprise circuits or other devices of different types which by means of the display screen 44 and starting from information obtained from the connected measuring sensor 42 generate and present on said display screen a map image of the surroundings of the vessel. Said map image should reproduce relevant and adequate portions of different forms of passage restrictions and obstacles with the necessary accuracy and resolution. The map circuits make is possible to generate said map image with selectable scale and with selectable orientation of direction (for instance North up, or the longitudinal direction of the vessel upwards in the image) with the position of the vessel indicated in such a way, the position of the vessel in the map image corresponds either to a fixed but selectable point on the surface of the display screen or to a point which moves in the correct scale relation with the speed of the vessel on the surface of the display screen (true motion).

The measuring mark circuits 46 generate and present on the display screen measuring marks (for instance points, circles or straight lines) for determining distance, direction, speed and/or acceleration that can be included in the display unit.

Control means 47 comprise means for adjusting map and measuring mark circuits and for switching the presentation of the map image and measuring marks on or off. Such control means may comprise means for focusing the map image, means for adjusting the light intensity of the image, means for adjusting image contrast, means for the selection of image scale, means for selecting the direction of orientation of the image, means for selecting a fixed or moveable vessel position on the image, means for switching the presentation of measuring marks on the display screen on or off, and means for adjusting measuring marks generated by measuring circuits 46. Said means are assumed to have a readable setting and also allow the information of the setting to be supplied in any analog or digital signal form, for instance an electric voltage.

The path model generating means 48 generates in parameter variable design said path model and presents it on the display screen in such a way that the presented path model is reproduced in true scale (in the same scale as the image of the surroundings), and also in such a way that said path model is reproduced correctly as to position and direction in relation to both the surroundings and the vessel. The path model generating means can be designated so that the path model is parameter controlled or symbol controlled in a manner to be described below. In the parameter or symbol controlled mode, the path model can be presented on the display screen either alone or together with the image of the surroundings/map image from unit 45 together with measuring marks from unit 46 and/or together with additional information from units 43 and 50.

By control means 49 of the path model generating means 48 parameters of the path model can be set and the presentation of the path model can be switched on or off. The control means 49 are so designated that they allow the reading of the parameter values set (or the parameter value programs set if such prevail) and also allow (possibly through the model generating circuits 48) information on the values set or the program of the parameter values to be obtained in analog or digital signal representation. Examples of the related control means are means for switching on or off the presentation of the path model completely or partially, control means for adjusting the point of setting of a yaw to be made to a distance L, the "planning distance," ahead of the vessel and along a course line starting from the point on the display screen that corresponds to the position of the vessel, said course line reproducing with necessary accuracy the actual compass course direction of the path of the vessel, control means for adjusting the length of the leading distance F or for setting a program (for instance tied up to selected routines for rudder setting at the beginning of a yaw) for the selection of the length of the leading distance F, control means for setting the radius of curvature $R_b$ of the curved portion of the path model or the established program for the curvature of said curved path portion, radius of path curvature and path curvature (the inverse value of the radius of curvature) being unequivocally commensurate terms, and control means for setting the direction of the portion of the path model that represents the exit course after the completed yaw.

In addition to the control means mentioned above for exemplification other means may be added. Such further means can be of a type not significant to the invention, e.g. common to control means 47, and can also be of a type relating to a certain embodiment of the invention. Reference will be made below to the latter type of further control means.

Receiving means 50 inclusive of the necessary control means makes it possible to co-present in a correct picture on the display screen 44 the added information in analog or digital form, e.g. alpha numeric information of importance for the steering and navigation of the vessel (simultaneously, sequentially or in another selectable way) together with the image of the surroundings and/or the path model. The actual added information can comprise information stored in a computer or in another way and possibly controlled by the measuring sensor 42. The added information can also comprise information calculated in a computer, for instance starting from information obtained from the measuring sensor and from information on the state of movement of the vessel. The related added information can for instance comprise a superposed chart image the position of which is correctly correlated geographically to the sensor image, manually or automatically, collision warning information, transponding information, synthetic passage marking and limitations of the maneuverability of the vessel in view of the steering-dynamic properties of the vessel.

Components 44, 45, 46 and 47 of the display unit can be the same units as in a normal indicator unit (for instance a radar indicator of the PPI type) of a measuring sensor 42 of the type selected (for instance a navigation radar) for cooperation with the invention. Therefore, such sections of the display unit can be regarded as completely corresponding to prior art technical arrangements in a normal navigation radar (enclosed by a dash-and-dot line in FIG. 12) and will not be described in detail in the following.

The image information presented on the display screen thus comprises, according to the description above, an image of the surroundings of the vessel, an image of the path model, and/or an image/images obtained by or due to the added information. The images can be built up by a screen pattern and/or as directly generated line images. In both cases the image contrast and the image dynamics can be selected by considering the information to be reproduced by the image.

In the screen pattern case the screen can be a dot screen or a line screen. In the line screen case the screen can comprise parallel screen lines (TV screen type), radial screen lines emerging from a scanning center (radar-PPI screen type) or may be arranged in other known or obvious ways (for instance a helical screen). The choice of screen is not essential for the invention.

As previously mentioned, it is convenient to use as a measuring sensor a navigation radar and, thus, to chose as a display unit a radar indicator of the PPI-type. The following description of the display unit therefore is based on (exemplifies) the presumption that the display unit basically comprises a radar indicator of the PPI-type.

Figure 13:
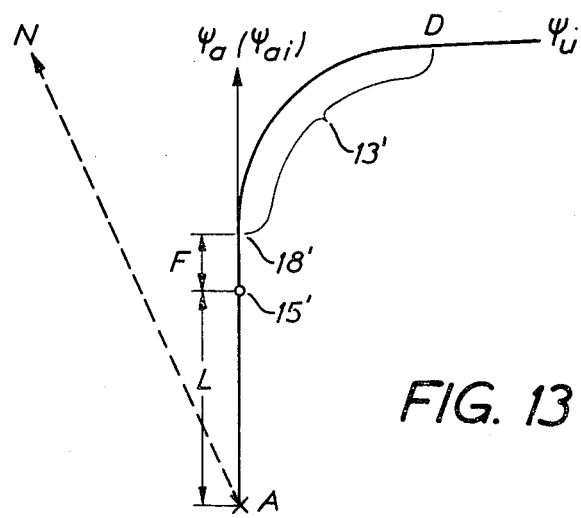
FIG. 13 represents an illustrative path model presented in a display unit.

The geometric path model which can be presented on the display screen of the display unit 44 has, before a yaw is initiated, the extent disclosed in FIG. 13. During the yaw, only the portion of the complete path model that corresponds to the remaining portion of the yaw is presented. In FIG. 13 the point A represents the position of the vessel. Normally, point A is the scanning center of the display screen; oof-centering being considered as a general case. In such a general case no special dot marking of the position of the vessel is needed. A dotted, straight line, denoted N, has been included in the presentation of the path model. The N-line represents the North direction on the image surface and the angular position thereof is obtained by means of the compass of the vessel. Basically, the N-line is not necessary when presenting the path model, but it is presumed that it may be desired by the user. The straight line starting from the ship position A in FIG. 13 and denoted by $\psi_a$ is allowed to extend to the periphery of the display screen. This $\psi_a$-line represents the actual course $\psi_a$ of the vessel, i.e. the direction of the speed vector. The angle $\psi_a$ is formed as the difference between the angle $\psi_f$, which is the longitudinal direction of the vessel, and the drift angle $\beta$. The angle $\psi_f$ is obtained from a signal transducer on a compass fixedly mounted to the vessel. The drift angle $\beta$ is obtained as a signal from drift angle measuring means. Possibly, said means can comprise a two component log followed by drift angle determining means. Thus, the angle $\psi_a$ can be formed by a difference former to which is supplied the quantities $\psi_f$ and $\beta$. Then, the line $\psi_a$ can be placed correctly as to the course on the display screen in relation to the North direction by means of, for instance, any known method from applied radar techniques. As shown in FIG. 13, the $\psi_a$-line represents the course of the vessel before and at the entrance to a yaw. Said course and therefore the course line can be denoted $\psi_{ai}$. In simpler cases, for instance when no type of auxiliary means for drift angle measurement is provided on the vessel, the $\psi_{ai}$-line can be replaced by a $\psi_{fi}$-line, which denotes the longitudinal direction of the vessel before a yaw.

Along the $\psi_{ai}$-line, a "planning distance" having the length L is marked. One of the end points of the distance L lies at the point A (= the position of the vessel on the image screen). The other end point, the end point of the distance L, denotes the point of setting 15' of the approaching yaw. On the display screen said point 15' can be marked in a known manner by a dot symbol of selected character and having good contrast against the $\psi_{ai}$-line. The length of the distance L is adjusted by means of a special control member. As can be seen from FIG. 13 the leading distance F also lies along the $\psi_{ai}$-line. The starting point of said distance F lies at the point of setting 15' of the path model and the end point lies at a point denoted 18' in FIG. 13 as well as in FIG. 2. It is not necessary to indicate said point in any particular way on the display screen. The length of the leading distance F is adjustable by means of a separate control member (adjusting member). Alternatively, said control member can be designed as a selector for selecting a program that determines the length F.

At point 18' the curved portion 13' of the path model starts and may be, for instance, a circular arc. The radius of curvature $R_b$ or the program for varying the radius of curvature is adjusted by means of a separate control member therefor. In FIG. 13 the end point of the curved path portion has been denoted D. At said point D the direction of the path of the curved path portion is equal to the set exit course after yaw, i.e. course $\psi_u$ at the exit from a yaw.

It is not necessary to indicate the point D in any particular way on the display screen. If no exit course after yaw has been set the curved path portion of the display screen may represent a large value of the difference between $\psi_u$ and $\psi_{ai}$, say for instance 180° (semicircle or similar).

A straight path portion starts from the point D of the path model and has been denoted $\psi_u$ in FIG. 13. This path portion which can extend to the periphery of the display screen has a direction that can be set by means of a control member.

When the presentation is technically realized, it is not necessary that the $\psi_u$ line starts at point D. It can as well have its starting point located at another position, for instance on the $\psi_{ai}$-line. However, it should pass the point D, at least after a yaw procedure has been initiated.

The presentation of the path model disclosed in connection with FIG. 13 can be modified in different ways. For instance, such modifications can result from the fact that it is desired to obtain greater simplicity, e.g., the planning distance L can be excluded fom the presentation. Furthermore, the course line $\psi_u$ can be excluded and may be replaced by a common electronic bearing rule or by mechanically turnable course lines, disposed, e.g. etched into a rotatable light filter, over the display screen. In some cases it can be simpler, both as to construction and/or use, to generate and present two curved path portions, both of which start from point 18' and which form mutual mirror images in relation to the $\psi_{ai}$-axis. In that case, one of said path portions represents a starboard yaw and the other represents a port yaw.

The display unit having a parameter controlled path model shall now be described with reference to FIG. 14.

According to this figure the display unit is represented by a display screen 44 and control members L, F (possibly under a cover), $R_b$ and $\psi_u$. The latter control member ($\psi_u$) is here divided into two control members. One of said members is intended for planning a yaw (GP) and the other is intended for carrying out a yaw (GV). It is assumed that the control members are designed such that they are tactically readily distinguishable. For simplicity, in the description illustrated herein, it is assumed that the curved portion of the path model comprises a circular arc. Starting from the definition of the path model, said circular portion can easily be described by a set radius value $R_b$.

The sensor which gives an image of the surroundings is intended to be a navigation radar. Basically, the display unit is a radar indicator of the PPI-type. In FIG. 14 the vessel is positioned at a point A on a straight course along the course line $\psi_{ai}$. Here, no North direction has been presented.

Figure 14:
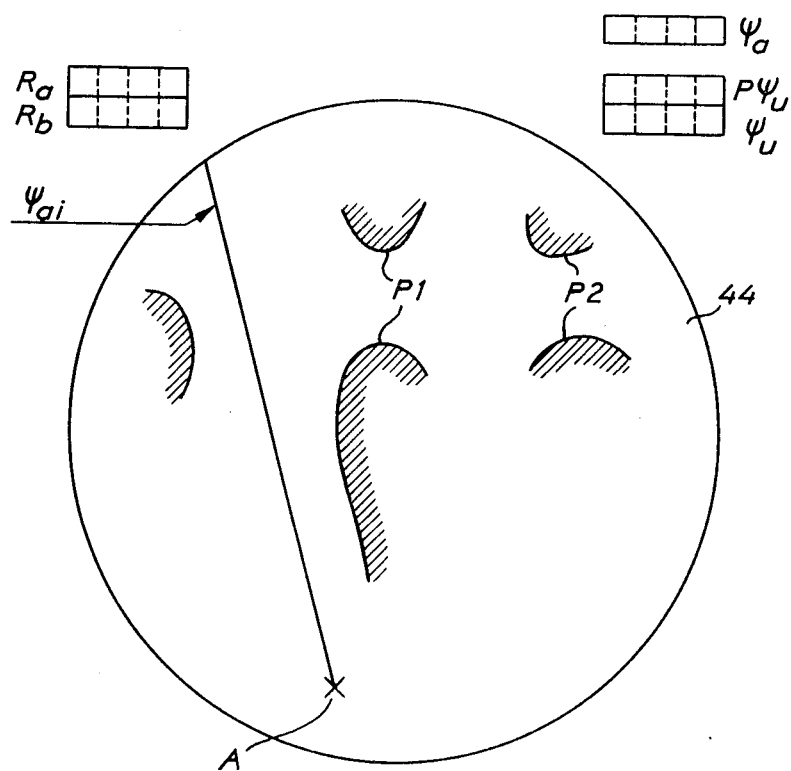
FIG. 14 represents an illustrative display unit having a parameter controlled path model where the display unit is represented substantially by a display screen and control members.
Figure 14:
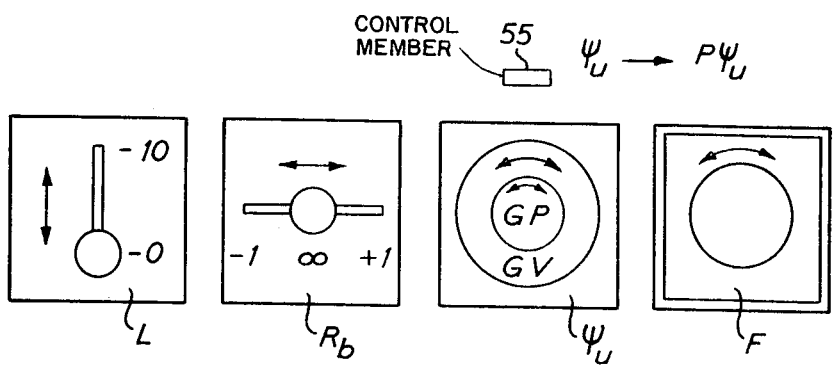

The image of the surroundings which is obtained from the navigation radar is shown by hatched portions on the display screen in FIG. 14. The pairs of capes denoted P1 and P2 in said figure form gates through which the vessel has to pass after a starboard yaw. Digital displays for $R_a$ and $R_b$ and for $\psi_a$, $P\psi_u$ and $\psi_u$ are arranged as shown in connection with the display screen.

The way in which a sequence of events relating to presentation, control and movement of the vessel can proceed if the vessel passes from the course $\psi_{ai}$ through the gates P1 and P2 is illustrated in FIGS. 15a–15f and 16a–16c. In the following description, it is assumed that a fixed value F has been preset, said value being adapted to the vessel and the maneuvering routines thereof.

Figure 15A:
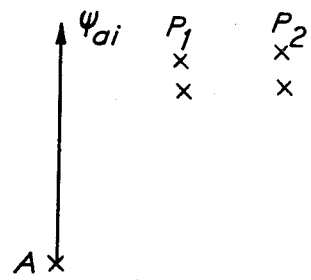
FIG. 15a – 15f illustrate the progress of events before and up to the set point of a yaw as said progress of events is presented on the display screen of a display unit having a parameter controlled path model according to FIG. 14, FIG 16a – 16c illustrate the progress of events during a yaw as said progress of events can be seen on the display screen of a display unit having a parameter controlled path model according to FIG. 14.
Figure 15B:
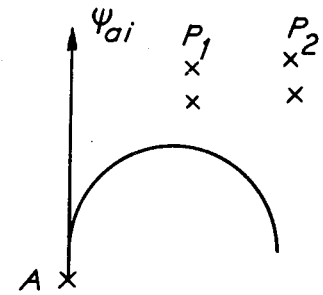

In FIG. 15a the same situation as illustrated in FIG. 14 is shown, though drafted in a somewhat more simplified form. In this situation a yaw circle arc is laid out by control member $R_b$. In the manner mentioned above said arc starts from a point on a $\psi_{ai}$-line, which is located at the distance F ahead of the vessel. In the present position, the circular arc can be laid out by a randomly chosen radius $R_b$. The presentation on the display screen after the yaw circle arc has been laid out appears in FIG. 15b. Here it should be observed that the laying out of the yaw circle arc does not effect any turning order (to a helmsman or to an automatic steering system), and that the yaw circle arc in this exemplary case (due to the fact that no value of $\psi_u$ has been given) is arranged to extend over 180° (a semi-circular arc).

Figure 15C:
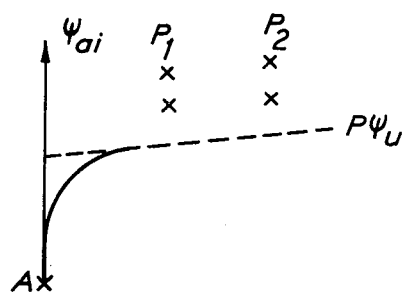
Figure 15D:
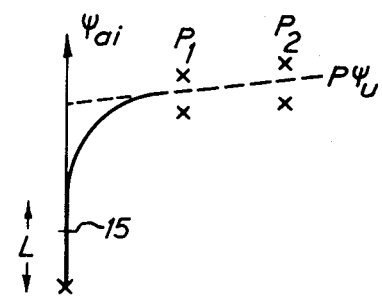

After the yaw circle arc has been laid out, a $\psi_u$-line is laid out by means of the control member GP. Since said line is a planned $\psi_u$-line it can be referred to as the $P\psi_u$-line. Preferably, said line can be represented by a dashed line. The presentation on the display screen after the $P\psi_u$-line has been laid out is shown in FIG. 15c. The $P\psi_u$-line is laid out so that it extends approximately in parallel to an imaginary line through the two gates P1 and P2. The direction of movement represented by the $P\psi_u$-line, for instance in digital form, can be presented on the digital display adjacent to the display screen (FIG. 14).

The next control step is to displace by means of control member L on the display screen the presented path model (comprising the path portions F, the yaw circle arc and the $P\psi_u$-line) a distance L so that the path model line $P\psi_u$ passes through gates P1 and P2. When this step is being carried out $R_b$ and $P\psi_u$ can also be fine-adjusted so that the desired matching of the path model to the two gates and other obstacles along the borders of the passage can be obtained. The presentation on the display screen after such adjustment appears in FIG. 15d. The start point of the F distance, i.e. the setting point 15' of the yaw in the path model, is indicated in this figure by a short transverse line.

The control member L and the associated circuits can be arranged so that they either position-control the position of the point of setting or so that they speed-control said position. When the vessel is moving along the $\psi_{ai}$-line, the distance L has to be decreased (counted down); otherwise the path model matching through gates P1 and P2 will be lost. Such counting down can be carried out either manually by means of control member L or by automatic dead counting so that the remaining portion of L, denoted L', is determined by a device which calculates L' according to the expression $$L' = L - V \cdot t$$

where V is the speed of the vessel and $t$ is elapsed time.

Figure 15E:
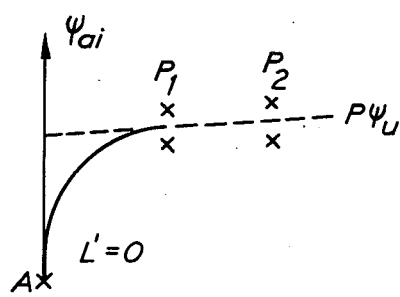

When L' is zero there will be obtained a signal which will be e.g., in the form of a lighted signal lamp at control member L. The presentation on the display screen when L' is zero is shown in FIG. 15e.

In this position, it is time for laying out, by means of control member GV, the executing part of control member $\psi_u$ a $\psi_u$-line (solid). This should be made so that this line coincides with the P$\psi_u$-line or possibly provides a desired correction thereof. When the $\psi_u$-line is laid out and the course line $\psi_u$ deviates from $\psi_{ai}$ more than a predetermined value, a steering order will be supplied. Said steering order will be given by supplying a set value $R_b$ (having a sign in this case for a starboard yaw) for presentation to the helmsman when manual steering is applied, and to the automatic steering system when automatic steering is applied.

For facilitating the adjustment of the $\psi_u$-line, the display unit and the control members thereof can be equipped with different additional arrangements. An example of such an arrangement is the setting of the direction of $\psi_u$-lines, i.e. set $\psi_u$-value, for instance in digital form, to be presented on a display placed adjacent to the display screen but also close to the display for P$\psi_u$ previously mentioned.

A motor may be provided which, when a push button 55 or similar control member placed close to control member $\psi_u$ has been operated, automatically turns the direction $\psi_u$ to coincide with the direction P$\psi_u$ when L' = 0. Manual operation of control member GV is assumed always to override the automatic operation.

Here it should be observed that when the turning of the $\psi_u$-line by means of control member GV has been started and carried out, as long as the difference between $\psi_u$ and $\psi_a$ exceeds some degrees, the correct initial steering order will be obtained. Thus, the turning of $\psi_u$-lines to a planned value need not be carried out instantaneously.

Figure 15F:
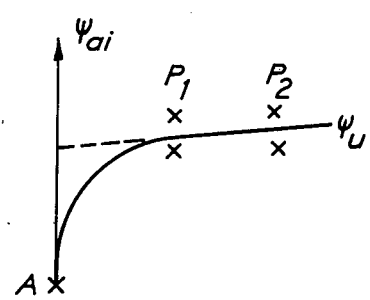

The presentation on the display screen when the vessel is at the setting point of the approaching yaw and when $\psi_u = P\psi_u$ is shown in FIG. 15f.

Starting from this position in a counting down of the leading distance is started, and the actual value of the course $\psi_{ai}$ is stored as set.

The counting down of F is carried out in a device that calculates the remaining portion F' according to a relation for instance of any of the following types.

$$F^1 = F - V \cdot t$$

$$F^1 = F \cdot f(\omega_f / \psi_b)$$

or $$F^1 = F \cdot g(R_b / R_f)$$

where $V = $ the speed of the vessel
$t = $ passing time ($t=0$ in the actual point of setting)
$\omega_f = $ the angular rate of the vessel
$\omega_b = $ the angular rate caused by the path curvature
$R_b = $ the set value of the yaw radius, and
$R_f = V/\omega_f$.

Figure 16A:
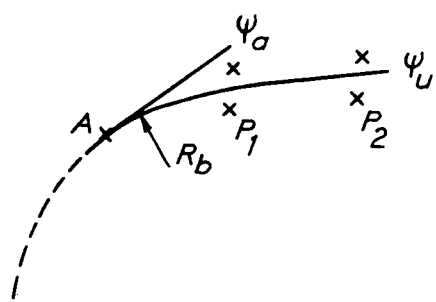

When the vessel is in the planned yaw and the yaw procedure has been carried out without disturbances a presentation on the display screen according to FIG. 16a is obtained. It is of particular interest in said latter figure to determine the value of $\psi_a$ during yaw for presentation on the display screen.

During the yaw the vessel can have a large drift angle or angle of attack, the steady state value (or the quasi steady state value) of which will not appear before a relatively long time has passed (corresponding a displacement of about 2F). In order to obtain during this time presentation of the remaining portion of the path model, which is correct as to direction and therefore also to position, it is necessary to determine $\psi_a$ during the yaw in way different than before the yaw. A device for determining $\psi_a$ during the yaw is described below.

Figure 16B:
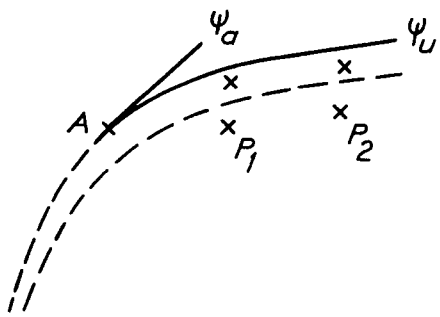

When the vessel carries out the planned yaw and the procedure has not been accomplished without disturbances, a situation can arise as presented on the display screen by a solid curve in FIG. 16b. The remaining portion of the path model no longer extends through gates P1 and P2 in the intended manner. Thus, the vessel has assumed an incorrect path. The reasons for the disturbance, for example, may be during manual steering that the helmsman has not steered quite correctly, there has been drift which could not be measured by available equipment in order to carry out a correction of the path, or the leading distance F has not been properly adjusted.

When the responsible officer (operator) observes such an error, he corrects by means of control member $R_b$ the path model by changing (in the example decreasing) the set radius and possibly adjusting $\psi_u$ so that the path again extends correctly through gates P1 and P2.

Figure 16C:
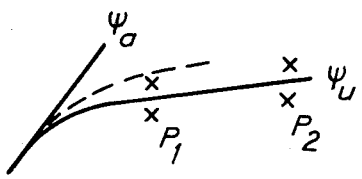

The presentation after such a correction appears in FIG. 16c. Here it should be noted that when the set radius $R_b$ is changed from a value, say $R_{b1}$, to another value, say $R_{b2}$, a distance $F_k$ will be inserted automatically into the model by means of a member therefor in the junction between the curved path portion having the radius of curvature $R_{b1}$ and the curved path portion having the radius of curvature $R_{b2}$. The intended device calculates $F_k$ ($F_k = F$ and generally $F_k < F$) according to a functional relation of the form $$F_k = f(\psi_a, \psi_{b1}, \psi_{b2}); \text{ alt. } g(R_a, R_{b1}, R_{b2})$$

When the yaw has almost been completed, i.e. when the difference between $\psi_u$ and $\psi_a$ is less than a small predetermined value, for instance 5°, the yaw radius value is disconnected as the control order. Instead $\psi_u$ is supplied, or the difference $\psi_u - \psi_a$. When steering manually, said control quantity is supplied for presentation or simply as a course order to the helmsman. In automatic steering the difference $\psi_u - \psi_a$ is supplied to the automatic steering system.

In view of what has been said above it can be seen that at small course changes (course corrections) $\psi_u$ or the difference $\psi_u - \psi_a$ may be used permanently as the control quantity or control signal.

Within the scope of the above description certain simplifications and changes of the display unit can, of course, be made. An example of an obvious modification is to eliminate control member L, electronic presentation of the planning distance L, (or the remaining portion of L'), control member GP and electronic presentation of course line P$\psi_u$ and to substitute therefor e.g. a mechanically rotatable course disc having a family of parallel course lines, said course disc being applied over and in juxtaposition to the display screen in the usual manner. It is assumed that the direction P$\psi_u$ of the course lines may be read by means of an edge scale or in another equivalent manner.

Another natural and obvious modification can consist in the use of the stem direction $\psi_{fi}$ (stem direction before yaw) when the direction $\psi_{ai}$ cannot be measured, for instance when the vessel is not equipped with a two-component log; if necessary the stem direction may be corrected by means of a special control member, by the introduction of an estimated drift angle/angle of attach or similar quantity equivalent therewith.

Figure 17:
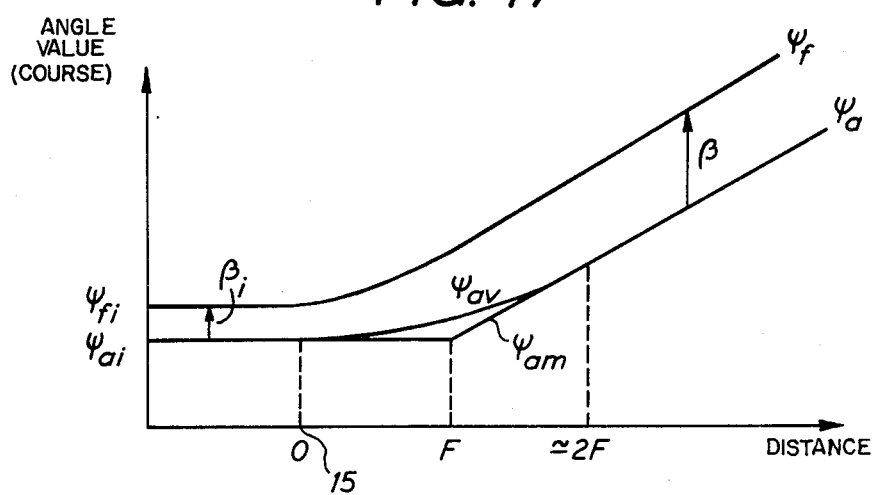
FIG. 17 illustrates a basic outline of an actual angle progress during a yaw.

The basic angle progress during a yaw having a constant radius appears from FIG. 17 where the horizontal axis indicates distance and the vertical axis indicates angle value (course). The point of setting is indicated at 15.

Figure 18:
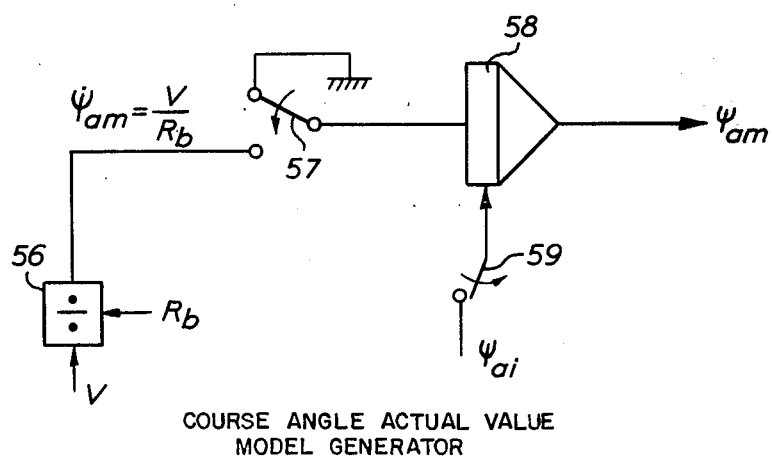
FIG. 18 represents an illustrative block diagram of a device for determining the actual course as established by the model during a yaw.

In said figure, the actual value $\psi_a$ of the course angle during the initial phase of the yaw has two different values. One value represents an actual value according to the model, $\psi_{am}$, and the other a true actual value $\psi_{av}$. After a distance having approximately the length of 2F measured from the yaw setting point 15 of the yaw, a steady state yaw angular rate has been obtained wherein $\psi_{av}$ is approximately equal to $\psi_{am}$. Before the steady phase it is important that it is $\psi_{am}$ and not $\psi_{av}$ which is used as a reference for the presentation on the display unit. Said $\psi_{am}$-value can be generated by means of a device basically of the type shown in FIG. 18. The device comprises a quotient extractor 56 which forms the quotient $\psi_{am} = V/R_b$, a switch 57 which supplies the obtained quantity $\psi_{am}$ to a following time integrating device 58 which receives $\psi_{ai}$ (true actual course value at the entrance to a yaw) as an initial value, and a switch 59 which is switched at $t = 0$, i.e. at the moment when the yaw is set, and thus stores the value $\psi_{ai}$ as the initial value of the integrator. When steady state conditions have been obtained and when the vessel is equipped with an angle of attack measuring device, it is possible to switch after the setting point from $\psi_{am}$ to $\psi_{av}$ as $\psi_a$ reference for the display unit after a distance longer than 2F, say for instance 3F.

It should be observed that an approximate value of $\beta$ may be obtained as the difference between $\psi_f$ and $\psi_a$.

In the following exemplary description of the generation of a parameter controlled path model, it is assumed that the display unit is a radar indicator of the PPI-type. The image generation can be carried out substantially in two different ways, viz. I. by forming the image by light pulses on the radial scan lines whereby the image will have a radial line-dot screen structure, and II. by forming the image as a line image by an interscan method.

Combinations of the two main alternatives I and II are possible.

Method I provides the advantage of relatively great construction simplicity combined with high accuracy. The drawback thereof is that the model image is updated relatively slowly, viz. at a rate which basically is determined by the rotational speed of the radar antenna. By certain measures, for instance "double rotation system," said drawback can be eliminated, at least partially. Such a modification, however, can imply that the simplicity will be partially lost or that the generation cannot be regarded as pertaining to method I above.

The image generating method II provides high updating speed when the path model is recorded. Method II corresponds most nearly to the method normally used for generating symbols of different kinds on radar indicators for different applications.

Figure 19:
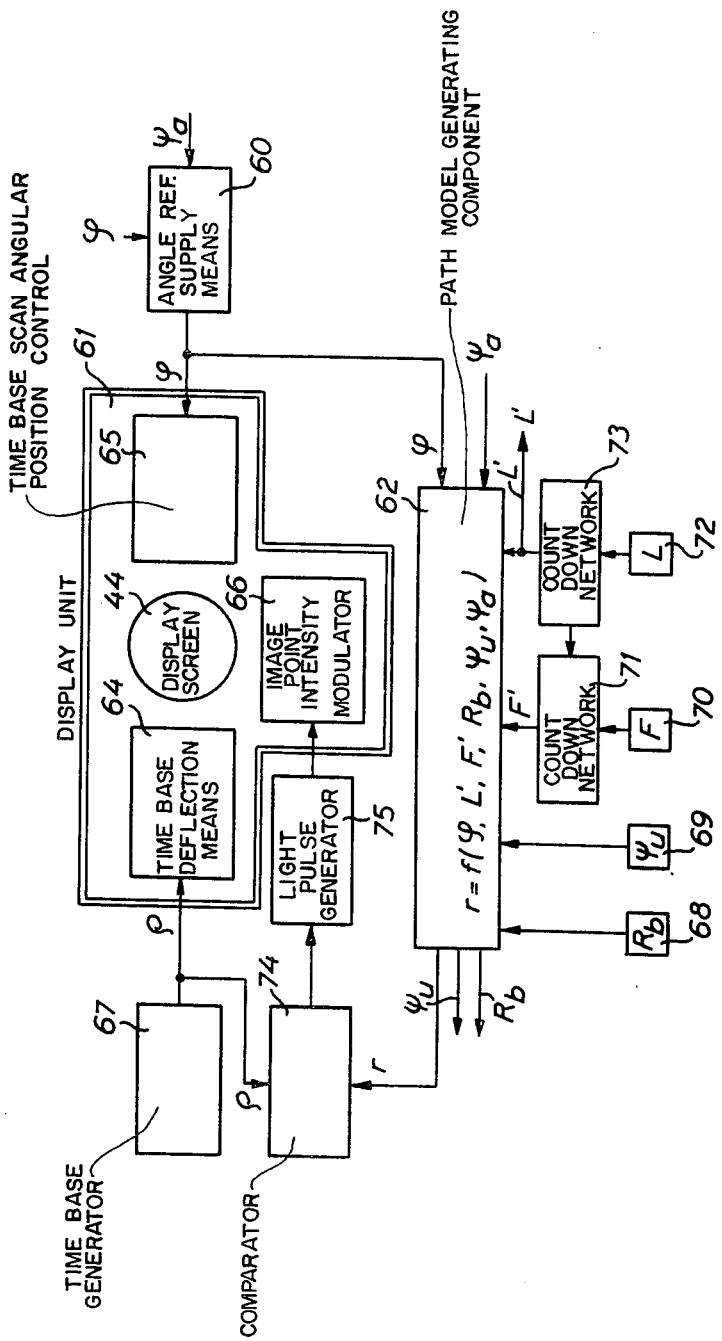
FIG. 19 represents an illustrative block diagram of a display unit having path model generating means working in polar coordinates and generating a parameter controlled path model image by a radial line-dot screen pattern, FIG. 20 defines the polar coordinates of the path model.

In FIG. 19 there is shown an exemplary system for image generating the path model according to method I.

Figure 20:
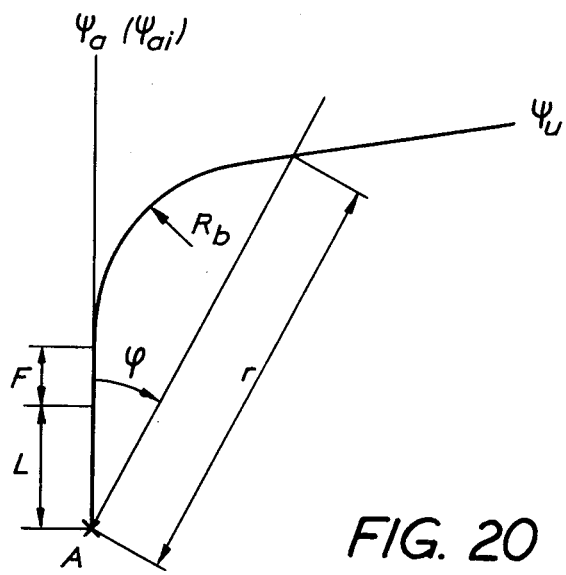

The path model equation is expressed in the polar coordinates $r$ and $\phi$ according to FIG. 20. The distance $r$, radius vector, is the distance from the ship position A to a point on the path model lying at an angle $\phi$ from the reference direction $\psi_a$. Thus, in the radar case the angle $\phi$ corresponds to a rotation of the antenna from the direction $\psi_a$.

Means 60 supplies an angle reference to the rotational angle of the radar antenna $\phi$ so that $\phi = 0$ when the direction of the radar antenna is $\psi_a$, in order to provide a defined signal $\phi$ (the direction of the radar antenna) to a display unit 61 and to a path model generating component 62. Unit 61 comprises a display screen 44, means 64 for time base deflection, means 65 controlling the angular position of the time base scan and means 66 for intensity modulation of image point. Signal $\phi$ is supplied to means 65. Means 64 receives time base $\rho$ from a time base generator 67. Component 62 is provided with a member 68 for controlling $R_b$, a member 69 for controlling $\psi_u$, a member 70 for controlling F, connected to component 62 through a counting-down network 71, and a member 72 for controlling L, connected to component 62 through a counting-down network 73. The latter has an output for supplying the signal L'. Component 62 receives not only signal $\phi$ but also signal $\psi_a$ and generates signals $\psi_u$ and $R_b$.

In component 62 for instance an electrical network, which may be provided by a computer or an analog machine programmed for the purpose, the radius vector $r$ is formed as a function of the angle$\phi$ quantities L', F', $R_b$ and $\psi_u$ (in reality $\psi_u - \psi_a$) forming the parameters. The quantity $r$, for instance in the form of a DC voltage, is applied to a comparator 74 where it is compared with the time base describing quantity $\rho$ from generator 67 which may comprise the time base generator for the radial scan normally included in a radar indicator. When $r = \rho$ the comparator generates a start pulse to a light pulse generator 75 to trigger said generator. Then, said generator instantaneously generates a light pulse which is supplied to said means 66 of the indicator display tube for intensity modulation. In this way an image dot having the polar coordinates $r$ and $\phi$ is obtained on the display screen 44 of the display tube, said image dot corresponding to a point on the image of the yaw model set.

When the radar antenna is being rotated angle $\phi$ successively passes actual values and a correctly orientated image of the path model will be generated in a scale determined by the scale factor of the time base quantity P.

The basic principle of the "double rotation system" method substantially corresponds to the principle of method I. Mainly, the difference lies in that according to method I, the time base scan is rotated at a speed equal to the antenna rotational speed, while in the double rotation system either of two rotational speeds can be selected. One of said speeds is equal to the rotational speed of the antenna, say $N_a$ revolutions per second ($\phi$), and the other one, say $N_m$ revolutions per second, is considerably higher.

$N_m$ can be e.g. 10 times as high as $N_a$. The rotational speed $N_a$ is used for recording the image of the surroundings on the radar. $N_m$ is used for recording the yaw model. The latter is generated in available space between the time axis scans of the radar.

If the radar image is updated at a speed of one time per two seconds, when e.g. $N_m = 10 N_a$, the yaw model will be updated at a speed of 5 times per second.

Figure 21:
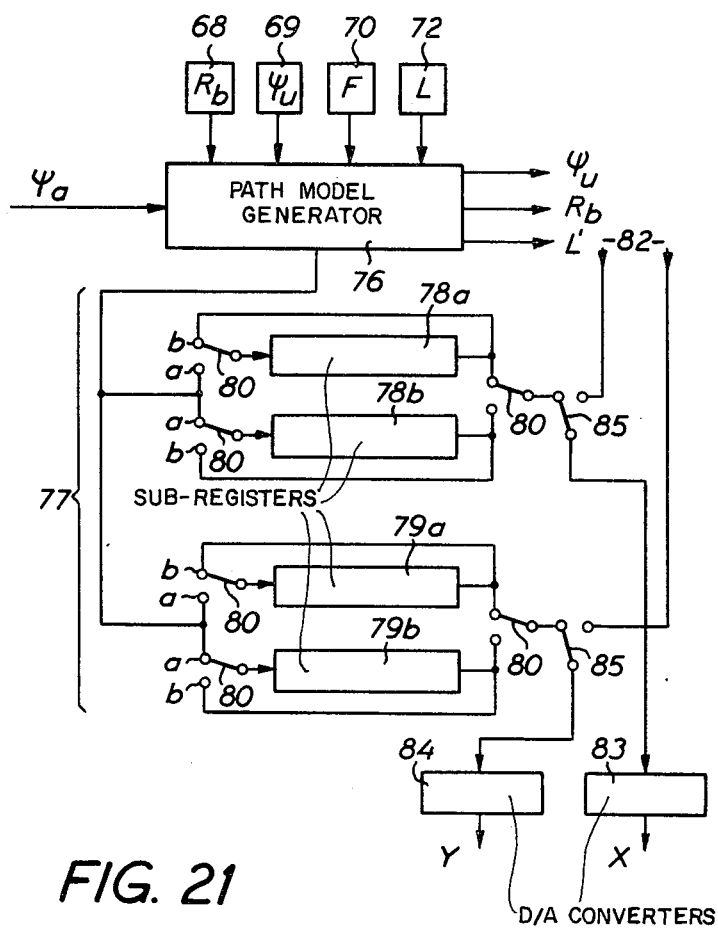
FIG. 21 represents an illustrative block diagram of a display unit having a parameter controlled path model image generated in rectangular coordinates during the interscan time of the image of the surroundings (interscan method)

A basic and exemplifying block diagram of a device according to method II is disclosed in FIG. 21. In said figure, the image display tube is represented by the deflection coils only, an X-coil for an x-deflection and a Y-coil for a y-deflection. The path model generating component is denoted 76, e.g. a dator, and is supplemented by a register unit 77 providing interscan switching.

Starting out from quantities $\psi_a$, $\psi_u$, $R_b$, F, (F') and L, (L'), the yaw path model determined x-and y-coordinates of a given pitch are calculated in component 70. Component 76 supplies said values in a series form. For instance, each 50 ms, 512 pairs of x/y-values representing the path in a square pattern having the selected pitch are supplied.

The series of figures is supplied to register unit 77, the x-values to an x-register and the y-values to a y-register. Each of said registers comprises two subregisters 78a, 78b and 79a, 79b, respectively, for instance shift registers. The switching between the two subregisters of the x- and y-registers is carried out by means of a clock pulse controlled switch 80 the position a of which corresponds to reading in and the position b of which corresponds to reading out. Signals from a measuring sensor (e.g. radar) are received at 82. The signals are applied to coils X and Y through a pair of digital-to-analog converters 83 and 84, respectively.

After reading into for instance the x-subregister 78a and the y-subregister 79a, switch 80 operates to make said two subregisters ready for reading out. The contents of the two subregisters are then recirculated so that the reading out can be carried out an arbitrary number of times. The reading out is done when the inputs of the display screen are free and switches 85 permits the information to be received from the shift registers and simultaneously initiates the clock pulses for the reading.

During said period component 76 supplies new path coordinates to the subregisters 78b and 79b and then said registers can supply information for the reading out.

In the block diagram in FIG. 21 the reading in and reading out functions have been separated as to time. This is not absolutely necessary, but can be suitable in certain applications. When reading in, the registers are clock controlled by switch 80 the timing being determined by the data flow of component 76. When reading out, the shift registers are controlled through switch 85 with due consideration to the requirement of suitable printing speed and/or suitable interscan time for display screen.

One embodiment of the display unit providing a symbol controlled definition and presentation of the path model will now be described below, reference being made to FIG. 22.

Figure 22:
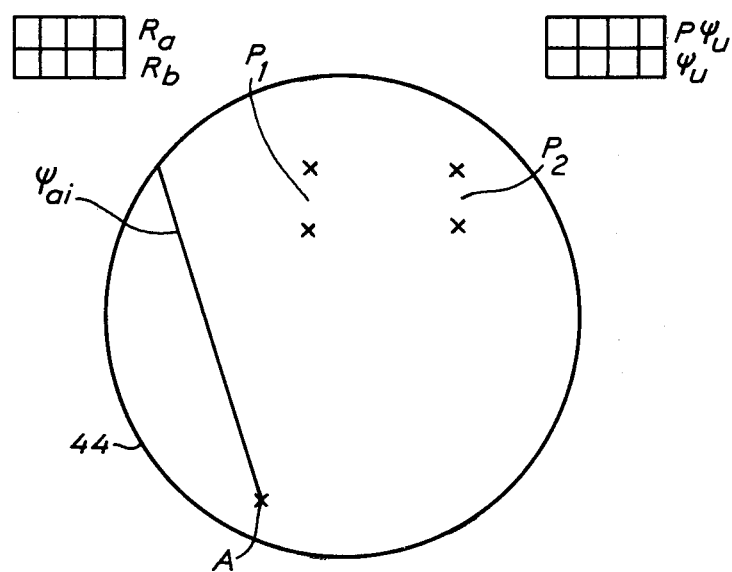
FIG. 22 represents an illustrative display unit having a symbol controlled path model.
Figure 22:
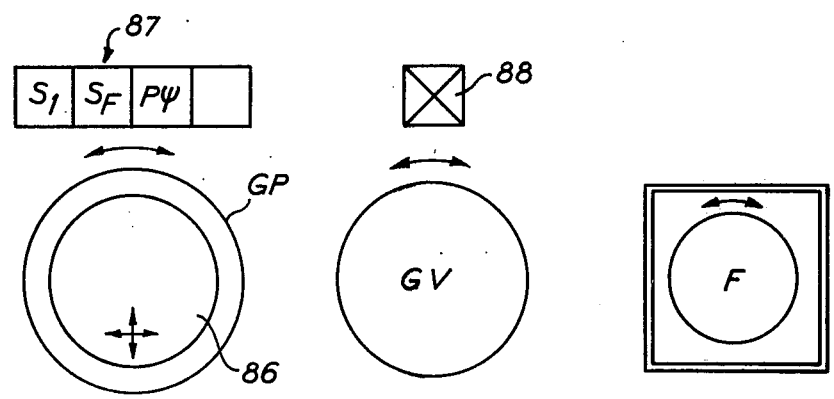

In FIG. 22 the display unit is shown as represented by a display screen 44 and digital course indicating displays and control members. The control members comprise a roll ball 86 for laying out position symbols, hereinafter denoted S combined with a defining index (for instance $S_1$, $S_2$, $S_F$ etc.), a control member GP for setting direction symbols/course lines, a symbol selector 87 of a push button type for selecting position symbols and direction symbols, a control member GV for course commands and a control member F for adjusting the leading distance F. The control members are constructed to be tactically and readily identified. Furthermore, there is an indicator 88 for L' = 0.

Also in this exemplary description the measuring sensor is a navigation radar and the display unit is basically a radar indicator of the PPI-type.

For simplicity it is assumed that the curved portion of the path model comprises a circle arc. Starting out from the definition of the path model said arc can be described readily by a set radius value $R_b$.

In FIG. 22 the vessel is located at the point A on a course line denoted $\psi_{ai}$ in said figure, representing the actual course at the entrance of a yaw. No presentation of the North direction has been made in FIG. 22.

The image of the surroundings obtained from the navigation radar is shown in FIG. 22 merely in the form of the two gates P1 and P2 indicated by cross pairs. The vessel shall pass through said gates after a starboard yaw.

Figure 23A:
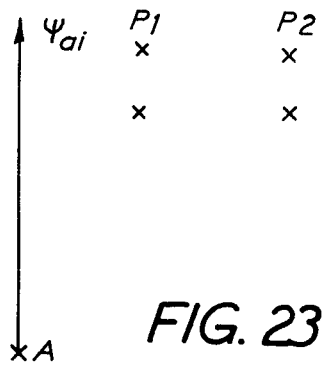
FIG. 23a – 23e illustrate the progress of events before and up to the set point of a yaw as said progress of events can be seen on the display screen of a display unit having a symbol controlled display unit.

The manner of progression of events relating to the movement of the vessel, the presentation and the maneuvering is illustrated in FIG. 23a–23a. When following the progress of events, it is assumed that a fixed F-value, or a program for determining F, has been preset and is adapted to the vessel and the maneuvering routines thereof.

In FIG. 23a there is shown in simplified form the same situation as illustrated in FIG. 22f. In this figure, a position symbol, say $S_1$, is selected by means of a button of the symbol selector 87, and said symbol is placed in a position corresponding to the desired passage through the nearest gate, i.e. gate P1, by means of the roll ball 86, see FIG. 23b. The position of said symbol on the display screen can be either position-controlled or speed-controlled by means of the roll ball, thereby illustrating one form of control member.

After the position symbol $S_1$ has been laid out it maintains the geographic position representation thereof during the entire yaw procedure. By means of prior art techniques this can be carried out in several ways, for instance by permanent manual correction by means of the control member, roll ball 86, by a member that carries out substantially dead counting of the position of the symbol relative to the vessel and thereby provides the necessary corrections, or by means in the form of a device of the kind generally denoted an automatic follow circuit which, together with the measuring sensor (radar), provides that a particular position symbol $S_F$ obtained by the selector 87 is laid by means of the roll ball over a target (beacon radar reflector, etc.) readily distinguishable by the measuring sensor and thereby is tied up automatically to said target and, due to the selected relationship, uniquely ties up the relative and therfore the geographic position of symbol $S_1$.

Different position symbols are so designed that they are readily identified as to shape, particular position or alphanumeric marking.

Figure 23B:
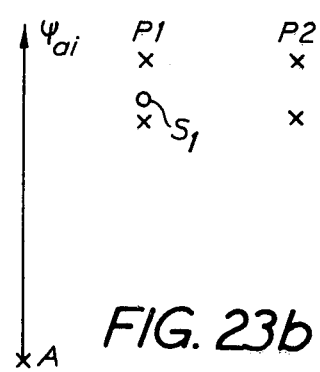

When the position according to FIG. 23b has been obtained, a direction line/direction symbol $P\psi_u$ going through (or out from) position symbol $S_1$ is laid into the display screen by pressing a selector button. By means of control member GP the direction line $P\psi_u$ is turned so that it passes, as passage for the vessel, through the two gates P1 and P2 in the desired manner. The presentation on the display screen obtained in this manner is disclosed in FIG. 23c. The direction of $P\psi_u$ may be made available on the display adjacent the display screen.

Figure 23C:
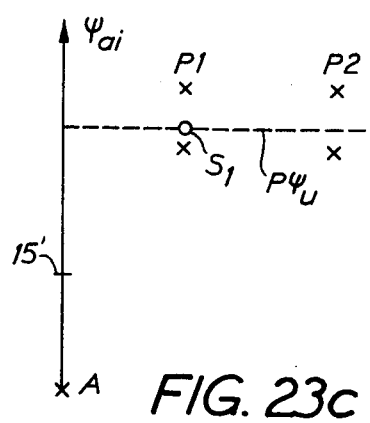

It should be noted that the operations that have led to the presentation situation in FIG. 23c do not imply that the display unit provides steering orders. Such orders are obtained first when control member GV (yaw execution) has been operated. Said settings imply that the curved portion of the path model, in this case a circle arc, which at the location of position symbol $S_1$ forms a tangent of direction line $P\psi_u$ and also at a uniquely determined point, point C (cf. FIG. 13) forms a tangent to the $\psi_a$-line, will be uniquely defined as to magnitude (radius $R_b$) and position. Since the leading distance F is given, the path model, including the position of the point of setting is defined and adapted to the approaching yaw.

A device forming part of the display unit and based on prior art techniques carries out calculation of the circle (size and position), calculation of the position of the tangent at point C on the $\psi_a$-line, and provides and provides that radius $R_b$ of the calculated circle is available as a control quantity, that the remaining distance L (L') up to the point of setting is available and that the curved path portion is presented on the display screen in the proper position.

By utilizing well-known circuitry techniques it is possible to design the display unit so that it presents the path model defined above in one of several possible ways. Examples of the selection of presentation are, that the entire path model is presented but the curved portion thereof is replaced by an extension of the $\psi_a$-line and the $P\psi_u$-line (i.e. a two sided polygon) according to FIG. 23c; that the entire path model is presented but the curved portion is replaced by a polygon line having three or more straight portions according to FIG. 23d; or that the entire path model is presented so that also the curved portion has a correct shape according to FIG. 23e.

Figure 23D:
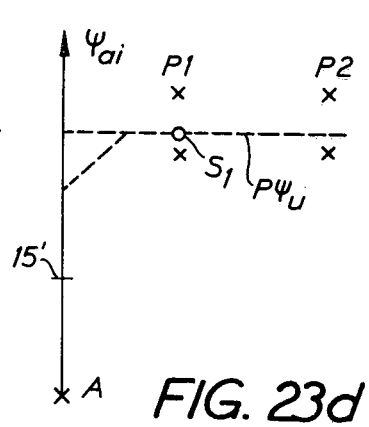
Figure 23E:
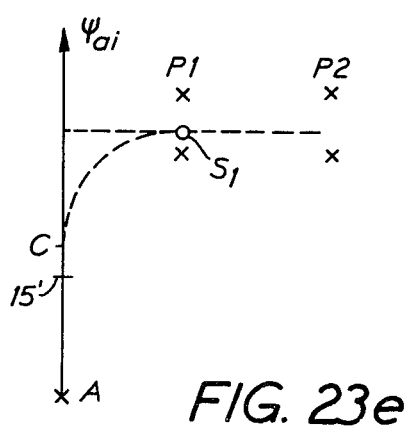

No matter what manner of presentation is selected, the position of the point of setting is marked by a postion symbol derived automatically for presentation; a transverse line in FIG. 23c–23e which is denoted 15'.

Irrespective of the method of presentation, the length of the planning distance L, the distance between the vessel and the point of setting, can be made available. The decrease of said distance to zero can be utilized for automatic execution of the approaching yaw.

The remaining procedure when carrying out the yaw coincides substantially with the description given with reference to FIG. 15. Essentially, the difference consists in that necessary corrections, if any, are carried out by adjusting (by means of roll ball 86) the position of the position symbol $S_1$ and, if necessary, adjusting the $P\psi_u$-line by means of the control member GV.

Figure 24:
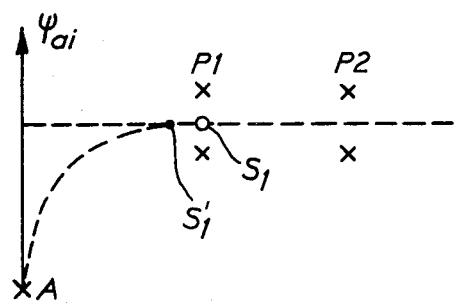
FIG. 24 illustrates necessary corrections of the path model adaption in a display unit having a symbol controlled path model when certain yaw geometry prevails.
Figure 25:
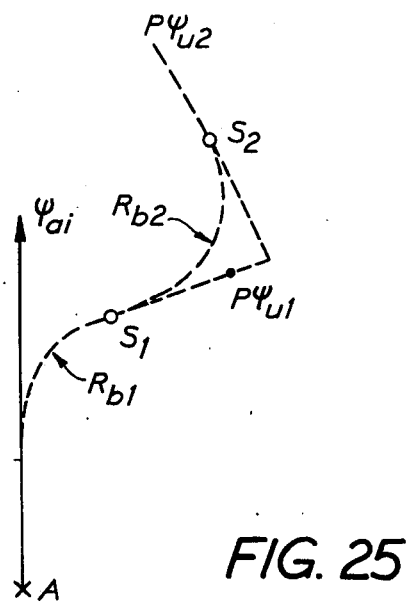
FIG. 25 illustrates a symbol controlled path model which is extended to include more than one yaw.

It might happen that an approaching yaw, for instance due to the fact that the path model is laid out on the display unit too late, has a geometry such that the planning distance is already-negative from the beginning. Therefore, means are provided for sensing the length of the distance L, and when said length is less than zero, said means provides a new and geometrically possible condition for definition of the magnitude of the radius of the curved path portion. This means that the actual circle arc will form a tangent to the $P\psi_u$-line at a point $S_1'$ lying inwardly of (closer to the vessel than) position symbol $S_1$. See FIG. 24.

The embodiment of a display unit described is well suited for the laying out of composite yaw paths by means of a number of position symbols $S_1$, $S_2$, etc. and direction symbols $P\psi_{u1}$, $P\psi_{u2}$, etc. selected by means of selector 87.

Of course, certain simplifications and changes of the display unit can be made within the scope of the above specification. An example of an obvious modification is that the control member GP (wheel), see FIG. 22, and then also the course line $P\psi_u$, see FIG. 22, is eliminated and replaced by a mechanically rotatable course disc having a set of parallel course lines, said course being placed over and in juxtaposition to the display screen in a conventional manner. The direction ($P\psi_u$) of the course lines is obtained, for instance electro-mechanically, so that the direction can be used for the calculation of the path model.

In the following, some examples of practical embodiments of the navigation system according to the invention will be described, the same reference numerals as in FIG. 4 being used where possible. For simplicity it is assumed that the vessel is equipped with a two component log which can provide approximately correct information on the speed of the vessel over ground. A compass provides the information on the geographic orientation of the vessel and, after correction for angle $\beta$, the geographic orientation of the speed vector. As long as the vessel is equipped with one longitudinally orientated log only, information on drift and angle of attack in order to carry out corrections may be introduced into the navigation system (if necessary) said corrections than being estimated or determined otherwise. Several auxiliary well known means and methods, can be used at such a reconstruction of the path speed V of the vessel over ground.

For the sake of completeness both alternatives of manual steering and steering by an automatic steering system will be shown in the exemplary cases. Also, concerning the path model defining unit, the chart/yaw lay-out case as well as the display unit case having a measuring sensor and auxiliary means for additional information will be exemplified. Two main lines will be considered, viz. that the steering signal consists of the difference between the set radius and the actual radius, and that the steering signal consists of a set value and an actual value of the angular rate of the path of the vessel or the angular rate of the vessel hull. Regarding the first principle reference is made to FIG. 26 disclosing a block diagram of the entire system, wherein the ship is denoted 20, a path model defining device (chart/yaw lay-out) 22, a measuring sensor 42, for instance a navigation radar, forming the input of a display unit (see FIG. 12), an angular rate transducer (rate gyro) 28 indicating the instantaneous yaw angle rate $\omega_f$ of the hull of the vessel, a gustient forming device 29 for determining the actual radius of the path of the vessel, a ship log 27 indicating longitudinal speed u and transverse speed v over ground, a rudder machine 21 and a regulator 41 thereof. The rudder machine and the regulator thereof form together with a difference forming device 90 for determining the control signal $R_b - R_a$ an automatic steering system enclosed by a dashed line in FIG. 26.

Figure 26:
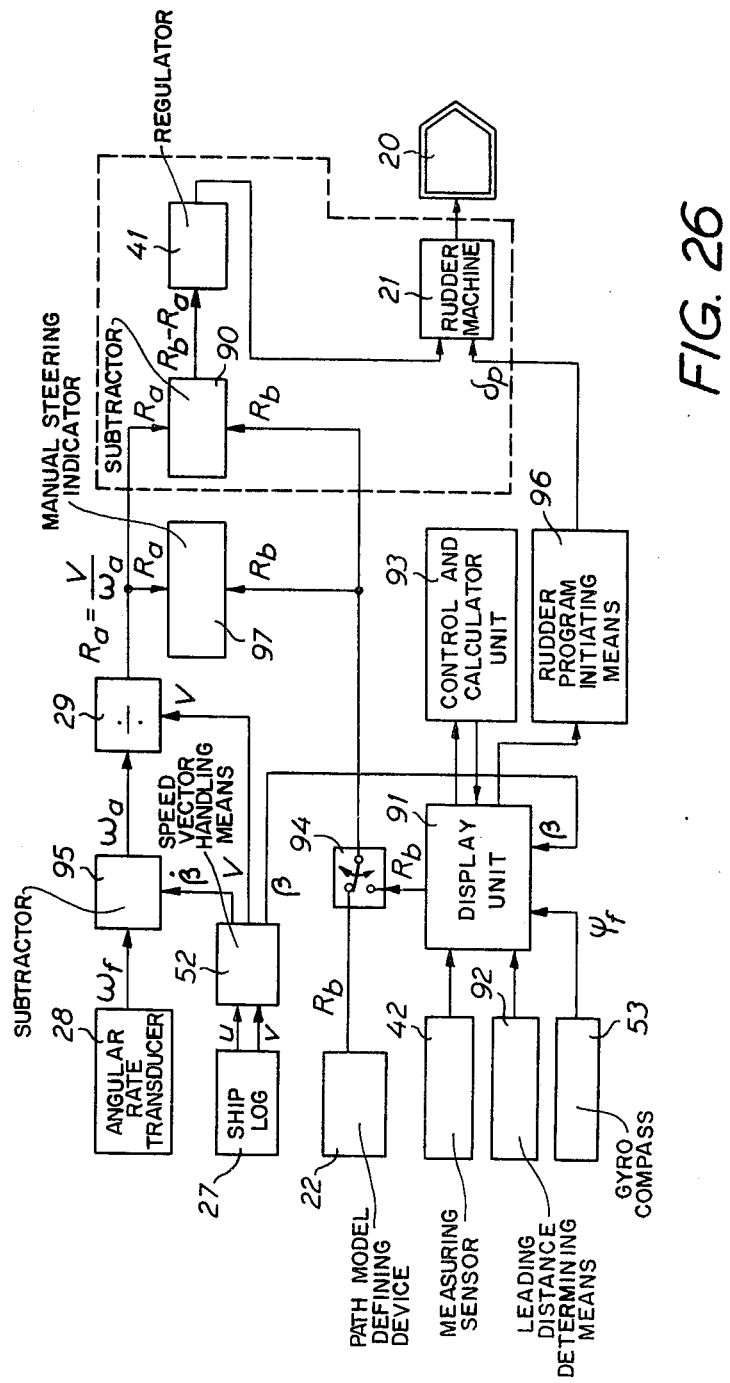
FIG. 26 represents and illustrative block diagram where the control signal comprises the difference between the set value and the actual value of the radius of the path curvature.

In the navigation system according to FIG. 26 there is included a display unit 91 for presenting an image of the surroundings and for generating and presenting a yaw path model. This unit receives signals from measuring sensor 42 in the manner described above, from auxiliary means 92 for determining and introducing a leading distance F, and from a gyro compass 53 or an equivalent means for determining the angle of the stem course $\psi_f$. Furthermore, from the speed vector handling means 52 there is supplied to unit 91 the signal $\beta$ representing the drift angle or the angle of attack of the vessel. The display unit also receives a signal from a control and calculator unit 93 for additional information. Display unit 91 supplies a signal $R_b$ to a switch 94 for the selection of the set radius $R_b$ from either chart/yaw lay-out, unit 22, or from display unit 91.

Difference forming unit 95 receives signal $\omega_f$ from transducer 28 and signal $\beta$ from the speed vector handling means 52 for determining the actual path angular rate $\omega_a$. The signal representing $\omega_a$ is supplied to quotient former 29 which also receives signal V for determining the actual radius $R_a$ of the vessel. From the display unit there is supplied a signal to means 96 for initiating rudder program $\delta_p$.

Signal $R_a$ from the quotient forming member 29 and signal $R_b$ from switch 94 are supplied to an indicator 97 for manual steering (yaw radius indicator) for the presentation of the control quantities $R_b$ and $R_a$ and/or $R_b - R_a$, as well as to the difference forming means 90 for determining the signal $R_b - R_a$.

Regulator 41 conrols rudder machine 21 depending on the quantity $R_b - R_a$, said machine receiving also a quantity $\delta_p$ for initiating rudder program.

The angular rate transducer 28 can be eliminated and replaced by a device that provides the differential $\dot{\psi}_f$ of the gyro compass signal $\psi_f$. In modern devices, such as platform gyro compasses, such angular rate signals of good (low noise) quality are obtained directly. Also, other devices installed aboard the vessel that measure distance and direction to fixed points in the surrounding, archipelago may permit, as mentioned previously, determination of the yaw angular rate $\omega_f$ of the hull of the vessel as well as the path angular rate $\omega_a$ and the path speed V over ground.

For accurate determination of the leading distance F, information of the following type (for the sake of clarity not shown in FIG. 6) should be fed to or refed to unit 92, viz. parameters representing the dynamic characteristics of the vessel, the steady state yaw radius at the beginning of the yaw selected rudder program $\delta_p$ for obtaining a given steady state yaw radius, alternatively a selected program for the yaw radius $R_p$ or the angular rate $\omega_p \cong V/R_p$, the speed of the vessel and parameters representing stream, wind, bottom conditions, etc.

In FIG. 26 the curvature measure of the path has been represented by the yaw radii $R_b$ and $R_a$, respectively. If instead the curvature of the path is selected to be represented by the inverse values $R_b^{-1}$ and $R_a^{-1}$, respectively, the quotient former 29 is inverted and inverting means are inserted in the signal line of $R_b$.

The calculations occurring in the different block elements may be performed by separate auxiliary calculation means of a digital or analog type. Entirely or partially, the calculations can also be carried out as partial sequences in a large computer intended for time sharing.

In the cases where an automatic steering system is operated, certain means are added for the sequential (logical) control of the yaw procedure. As previously mentioned this can be divided into three different phases:

I. an initial phase during which the yaw radius decreases from an infinite magnitude to the predetermined steady state value $R_b$ and, II. a steady state phase during which the steering automation causes $R_a$ to be approximately equal to $R_b$, III. an end phase during which the yaw radius increases from $R_b$ to an infinite magnitude simultaneously as the vessel assumes the new path course direction.

Either of two alternatives may be selected when specifying the logical conditions forming the basis for the shifting between the said phases I-III during the yaw. Examples of means for carrying out the shifting of the actual control signal connections have not been shown in FIG. 26 for the sake of clarity.

Figure 30:
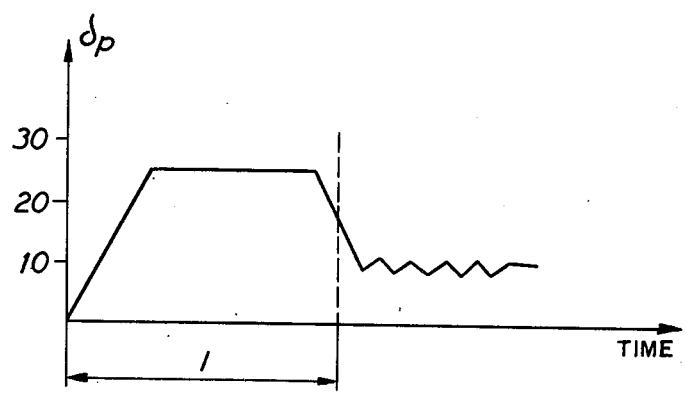
FIG. 30 represents an illustrative initiating rudder program $\delta_p$.

According to the first alternative a suitable rudder angle program $\delta_p$, for instance of the kind disclosed in FIG. 30, where the horizontal axis indicates time and the ordinate indicates $\delta_p$ and where the initial phase is marked by an arrow I, is introduced during the initial phase I through means 96; the rudder angle increases initially at a maximum rate and is then maintained at a relatively large value, for instance 25°. This condition is maintained as long as $|R_a - R_b| > \epsilon_1$ where $\epsilon_1$ is zero or a quantity that is relatively small compared to $R_b$.

When $|R_a - R_b| < \epsilon_1$ the input of the rudder angle program is interrupted and instead the control signal $\Delta = R_b - R_a$ (alternatively the control signal $\Delta = R_b^{-1} - R_a^{-1}$) is supplied to the regulator input of the automatic steering system, steps being taken for minimizing the control signal according to known servo control techniques. Then, the yaw merges into the steady state phase II. The selection of maximum rudder angle deflection in the rudder program is determined mainly by the magnitude of the steady state yaw radius $R_b$ prescribed by the yaw path model. As previously mentioned, the length of the leading distance F will be dependent thereon.

The steady state phase II — with control signal $\Delta = R_b - R_b$ (alternatively signal $\Delta = R_b^{-1} - R_a^{-1}$) supplied to the regulator input — is maintained as long as the following relations prevail $|R_a - R_b| < \epsilon_1$ $|\psi_a - \psi_u| > \epsilon_2$ where $\psi_a$ is the actual path course angle, $\psi_u$ the exit course angle of the straight distance after the yaw and $\epsilon_2$ an angle approximately of the size of 2°-15°.

When $|\psi_a - \psi_u| < \epsilon_2$ the input of the control signal $\Delta = R_b - R_a (\text{alt. } \Delta = R_b^{-1} - R_a^{-1})$ to the regulator input will be interrupted. Instead a control signal $\Delta = \psi_u - \psi_a$ is supplied to the regulator input and said signal minimizes the control signal according to known servo control principles. The end phase III of the yaw has started. Since the end phase of the yaw provides other dynamic conditions than the steady state phase, it may be necessary to amend some parameter values in the signal processing section of the regulator. The yaw is terminated when $\psi_a - \psi_u$.

Instead of operating with a given rudder angle program or rudder progress $\delta_p$ a suitable yaw radius program or yaw radius progress $R_p$ is introduced for decreasing the yaw radius $R_a$ from an infinite magnitude to the value $R_b$ prescribed by the yaw path model. In this case, a control signal $\Delta = R_p - R_a$ is applied to the regulator input of the automatic steering system already at the beginning of the yaw. At $R_a \approx R_p = R_b$ switching occurs to control according to the model determined yaw radius value $R_b$. In this case it can be more suitable to operate with inverted values of radii (the curvature measures $R_p^{-1}$) for forming the control signal $\Delta = R_p^{-1} - R_a^{-1}$. As previously mentioned, this is an anology with a scale factor change of the control signal.

In this alternative the two yaw path phases I and II can be regarded as coincident. To prescribe such a yaw radius decrease without operating with two large servo control errors may imply a problem. In view thereof, certain conditions for limiting the rudder deflection may be necessary. Means (for instance a computer) for generating and introducing the initiating yaw radius program $R_p$ (alternatively $R_p^{-1}$) has not been shown in the figure for the sake of clarity.

Due to the fact that also during the initial phase of the yaw a given program or progress of e.g. the yaw radius ($R_p$) is being applied, the movement of the vessel will be kinematic, i.e. basically unaffected by changes of the dynamics of the vessel and environment, also during said phase.

In this alternative the magnitude of the leading distance F depends mainly upon the selected radius program $R_p$ for the initiating decrease of yaw radius from an infinite value to the value prescribed by the yaw path model. Execution of the remaining portion of the yaw is carried out in a way similar to that of the first alternative.

Figure 27:
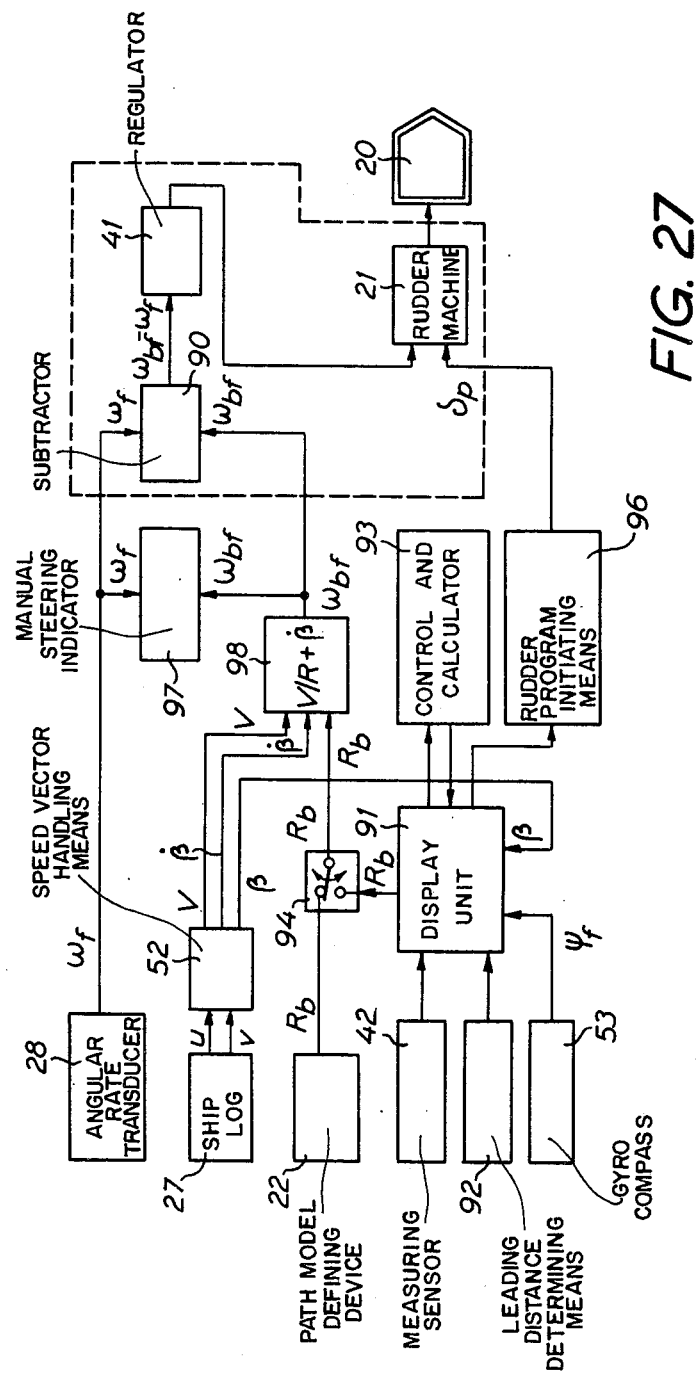
FIG. 27 represents an illustrative block diagram where the control signal comprises the difference between the set value and the actual value of the angular rate of the hull of the vessel.

In FIG. 27 the block diagram of the complete system according to the first alternative of the above type is shown in case the control signal comprises the difference between the set value and the actual value of the angular rate of the path of the vessel. Concerning peripheral units, the diagram roughly corresponds to the preceding diagram according to FIG. 26.

The difference forming unit 95 and the quotient forming unit 29 have been deleted and replaced by a calculation unit 98 for providing the set angular rate $\omega_{bf} = V/R_b + \dot\beta$ by which the angular rate of the hull of the vessel shall be controlled. In this case the manual steering indicator 97 is arranged to present the control quantity $\omega_{bf}$, $\omega_f$ and/or $\Delta = \omega_{bf} - \omega_f$, and the difference former 90 defines the control signal $\Delta = \omega_{bf} - \omega_f$.

In this case the sequential transition between the different phases of the yaw procedure can follow the same pattern as described with reference to FIG. 26. Unchanged conditions also prevail for the selection of program for the rudder deflection and yaw radius, respectively, during the initial phase I and for the magnitude of the value of the leading distance F associated therewith. In case a yaw radius program $R_p$ is selected, it is suitable to select during the initial phase I as a control quantity an angular rate program $\omega_{pf}$ for the hull of the vessel according to $\omega_{pf} = V/R_p + \dot\beta$ corresponding to said program.

Figure 28:
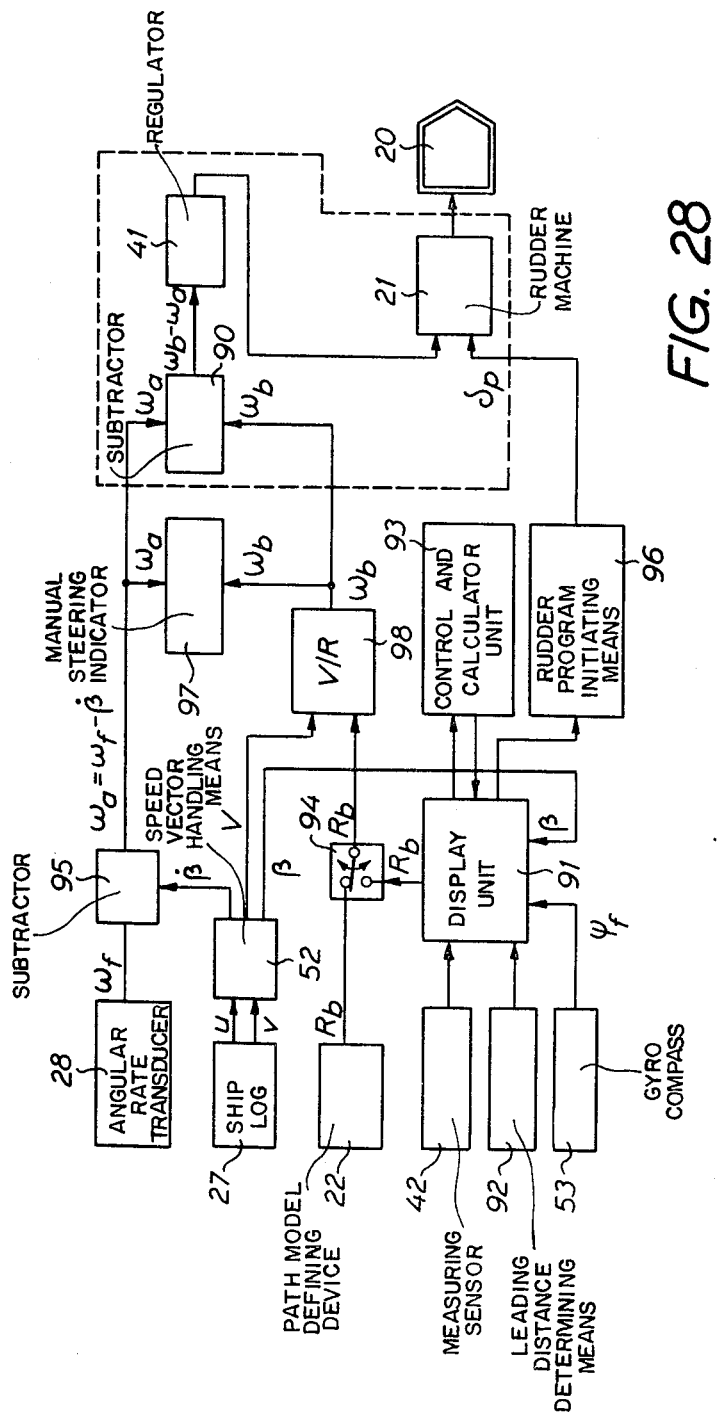
FIG. 28 represents an illustrative block diagram where the control signal comprises the difference between the set value and the actual value of the path angular rate of the vessel.

The practical realization of the block diagram shown in FIG. 27 is well suited for at least some technically equivalent block diagram transformations. The drift angle rate or the angle of attack rate $\dot\beta$ can be moved for instance from element 98 — shown in FIG. 27 — to a difference former 95 in the signal line of $\omega_f$, where $\dot\beta$ is added with reversed sign as indicated in FIg. 28. In this case the control signal will represent the difference between the set value and the actual value of the path angular rate of the vessel. In this case the manual steering indicator 97 presents the control quantities $\omega_b$, $\omega_a$ and/or $\Delta = \omega_b - \omega_a$, and the difference former determines the control signal $\Delta = \omega_b - \omega_a$.

Figure 29:
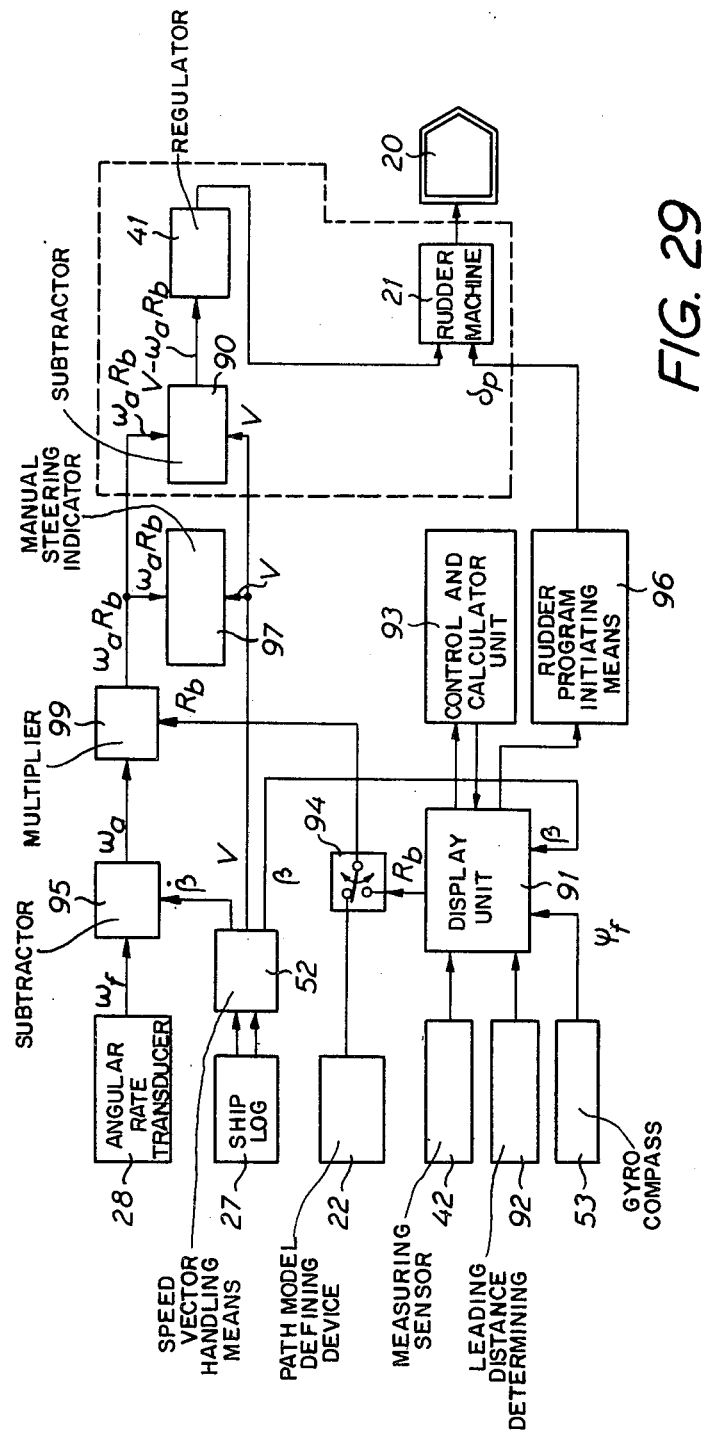
FIG. 29 represents an illustrative block diagram where the control signal comprises the difference $V - \omega_a R_b$.

In FIG. 29 there is shown another technically equivalent block diagram transformation which starts from the diagram shown in FIG. 28. The division by the set radius $R_b$ in the block element 98 (shown in FIG. 28) has been transferred, in FIg. 29, as a multiplication to a product forming block element 99 in the signal line of the angular rate $\omega_a = \omega_f - \dot\beta$ of the path of the vessel. The block diagram now expresses that the system functions aim at satisfying the general kinematic condition of the yaw path when said expression has the form $V - \omega R = 0$. Compared to the preceding case, the control signal of the system has merely been affected by a scale factor change. In FIG. 29 the manual steering indicator 97 represents the control quantities $V$, $\omega_a$, $R_b$ and/or $\Delta = V - \omega_a R_b$, and the difference former 90 determines the control signal $V - \omega_a R_b$.

Other technically equivalent block diagram transformations can also be applied. Generally, the scale factor change implied to the control signal in the above exemplified equivalent embodiments, provides the possibility of selecting in different applications a proper matching of the control signal to the regulator section of the automatic steering system. This means that the requirements of the adaptivity of the regulator may be more favorable.

For the sake of simplicity it has been shown in FIGS. 26 to 29 that the manual steering indicator 97 presents the same control quantities that have been used for obtaining the control signal to the automatic steering system. However, this need not be the case. Independently of which control signal is supplied to the automatic steering system, it seems to be most natural in most applications to present the set value and the actual value of the yaw radius in the manual steering indicator which obviously presents to the helmsman or other persons on the bridge the most immediate comprehension of the narrowness of the yaw.

We claim:

1. A method for substantially producing kinematic steering of a vessel in a yaw path having a given radius of curvature conforming with a predetermined control law, comprising the steps of: determining, in a path model, the set of values of one of the quantities radius of path curvature $R_b$ and path angular rate $\omega_b = V/R_b$ of the vessel; determining the actual value of the path angular rate $\omega_a$ and the radius of path curvature $R_a = V/\omega_a$ of the vessel, V being a measure at least approximately of the speed over ground of the vessel; generating a control signal from the values thus determined, which is a function of a quantity which represents the difference $R_{b-Ra}$, and effecting in dependence thereon a change of a rudder position of said vessel required for minimizing said control signal.

2. A method as claimed in claim 1, further comprising the step of presenting said control signal on a display means for permitting manual steering of the vessel.

3. A method as claimed in claim 1 further comprising the step of supplying said control signal to means for controlling the rudder machinery of the vessel for stabilizing the steering procedure.

4. A method as claimed in claim 3 wherein said control signal forming a measure of the difference of curvature and supplied to the control means of the rudder machinery of the vessel also includes a signal component which is a measure of an error function.

5. A method as claimed in claim 1 wherein said control signal includes a measure of the difference of the curvature as well as a component representing an error function of the general form $f(R_b, R_a, V, t)$.

6. A method as claimed in claim 5 wherein said error function is formed during a part of the yaw.

7. A method as claimed in claim 5 further comprising the step of introducing, at the presentation of said actual values of $R_b$ and $R_a$, additions to at least one of said values $R_a$ and $R_b$ which are of a character to comprise a measure of said error function and which tend to reduce the error function during manual steering.

8. A method as claimed in claim 1 further comprising the step of introducing during an initiating phase of the yaw when the curvature of the path is changing from a straight course to the steady state phase of the yaw, a predetermined program for the rudder movement.

9. A method as claimed in claim 1 further comprising the step of introducing a predetermined program for the change of the curvature of the path during movement along a straight course to the entrance of the steady state phase of the yaw.

10. A method as claimed in claim 1 further comprising the step of introducing a predetermined program for the change of the path angular rate during movement along a straight course to the entrance of the steady state phase of the yaw.

11. A method as claimed in claim 1 further comprising the step of introducing a predetermined program for the angular rate of a hull of the vessel during movement along a straight course to the entrance of the steady state phase.

12. A method as claimed in claim 1, wherein said control signal is a function of the quantity $R_b - R_a$.

13. A method as claimed in claim 1, wherein said control signal is a function of the quantity $R_b^{-1} - R_a^{-1}$.

14. A method as claimed in claim 1, wherein said control signal is a function of the quantity $\omega_b - \omega_a$.

15. A method as claimed in claim 1, wherein said control signal is a function of the quantity $\omega_b^{-1} - \omega_a^{-1}$.

16. A method as claimed in claim 1, wherein said control signal is a function of quantity $V - R_b \omega_a$.

17. A device for substantially producing kinematic steering of a vessel in a yaw path having a given radius of curvature conforming with a predetermined control law, comprising: means for determining the actual value of the path angular rate $\omega_a$ and the actual value of the radius of path curvature $R_a = V/\omega_a$ of the vessel, $V$ being a measure at least approximately of the speed over ground of the vessel; means for generating a control signal from said actual values and from the set value of one of the quantities: radius of path curvature $R_b$ and path angular rate $\omega_b = V/R_b$, $R_b$ and $\omega_b$ being determined by means of a preselected path model, said control signal being a function of a quantity of which represents the difference $R_b - R_a$, and means for utilizing said control signal for adjusting a rudder position of the vessel.

18. A device as claimed in claim 17, further comprising: means for initiating the yaw steering procedure a predetermined distance ahead of the starting point of the yaw path of the vessel, corresponding to a decrease of the yaw radius $R_a$ from infinity to a value close to $R_b$, where said predetermined distance is a given predetermined quantity defined as a function of the desired yaw radius $R_b$, the dynamic properties of the vessel, the entrance speed into the yaw and a program selected during the initiating phase of the yaw for initiating rudder movement, which causes a decrease in the yaw radius from infinity to $R_b$ and an increase in the path angular rate from zero to $\omega_b$.

19. A device as claimed in claim 17, wherein there is further provided a rudder control system of the vessel which comprises means for manual steering the vessel and indicator means located in proximity to said means for manual steering for presentation of the values $R_b$ and $R_a$ arranged in such a manner that decreasing values of $R_b$ and $R_a$ correspond to indicator readings increasing to the left during a port yaw and to indicator readings increasing to the right during a starboard yaw.

20. A device as claimed in claim 19 comprising further indicating means for direct presentation of the difference $R_b - R_a$ arranged in such a manner that the indicator gives a reading to the left for $R_a > R_b$ during starboard yaw and for $R_a < R_b$ during port yaw, and vice versa.

21. A device as claimed in claim 17 wherein there is further provided a rudder control system of the vessel which comprises means for manual steering the vessel and indicator means located in proximity to said means for manual steering for presentation of $\omega_b$ and $\omega_a$, said indicator means being arranged in such a way that increasing values of $\omega_b$ and $\omega_a$ correspond to indicator readings increasing to the left during a port yaw and to indicator readings increasing to the right during a starboard yaw.

22. A device as claimed in claim 21 further comprising indicator means for direct presentation of the difference $\omega_b - \omega_a$ arranged in such a way that the indicator gives a reading to the left for $\omega_a < \omega_b$ during starboard yaw and for $\omega > \omega_b$ during port yaw, and vice versa.

23. A device as claimed in claim 17, further comprising means for generating a signal component in the steering control signal representing an error function of the general form $f(R_b, R_a, V, t)$.

24. A device as claimed in claim 23, further comprising a signal generator for indicating at least one of the sign and magnitude of said error function.

25. A device as claimed in claim 17 further comprising path model defining means for determining the set values $R_b$ and $\omega_b$, respectively, of an approaching yaw, which comprises a display unit connected to a measuring sensor, said display unit comprising a display screen for presenting a true scale and a direction oriented image of the surroundings of the vessel which is controlled by information from a measuring sensor, said image conveying the information necessary for carrying out a yaw, and means for synthetic generation, presentation and setting of a yaw path model to be superposed on the image on said display screen, the latter said means being so arranged that on the display screen are formed a course line starting from a point on the display screen corresponding to the position of the vessel in the image of the surroundings, said course line reproducing the actual path course direction with necessary accuracy and compass correctness a straight line path portion of a predetermined length oriented along said course line and starting from a selectable point in a direction from the position corresponding to the position of the vessel, a curved path portion which, with said straight line portion as a tangent starts from the end point of said path portion, the curvature of said curved path portion following a predetermined control law.

26. A device as claimed in claim 25, further comprising control means for setting control law of said curved path porton.

27. A device as claimed in claim 25, further comprising control means for setting the length of said straight line path portion.

28. A device as claimed in claim 25, further comprising means for determining the point in the curved path portion where the tangential direction of the path portion coincides with the course direction for the continued straight path of movement planned after the yaw, and means for synthetically generating and presenting a second rectilinear path portion in said indicator corresponding to said further path of movement.

29. A device as claimed in claim 28, further comprising control means for setting the course direction for said second rectilinear path portion.

30. A device as claimed in claim 25, further comprising means activated at the setting of the yaw for reconstructing the image of the remaining portion of the path model in such a way that during ideal conditions said remains portion is maintained in the desired position in the later part of the path model, and during disturbed conditions, when the path model is not maintained in the desired position, said remaining portion is suited for a correction of the yaw procedure.

31. A device as claimed in claim 30 further comprising means, arranged such that when a correction is carried out of the path, a new smaller distance of correction is obtained, the size of the latter being dependent on the magnitude of the necessary correction.

32. A device as claimed in claim 17 further comprising a path model defining device for determining the set values $R_b$ and $\omega_b$, respectively, for an approaching or pending yaw procedure which comprises a display unit connected to a measuring sensor, said display unit including a display screen for presenting a true scale and directionally oriented image of the surroundings of the vessel controlled by information from a measuring sensor, said image conveying the necessary information for carrying out a yaw, means for synthetically generating and presenting on said display screen at least one symbol for position and direction, means for ensuring that the symbols laid out on said display screen maintain the geographic representation thereof during the yaw procedure, and means for calculating a yaw model path starting with a straight path portion of variable length, said straight path portion coinciding with a course line representing the actual path of the vessel and forming a tangent to a following, curved yaw path portion starting from the end point of the straight path portion, the curvature of the curved yaw path portion following a predetermined relation, said curved yaw path portion forming a tangent to a course line passing through the point of a laid out position symbol and having a direction determined by a direction symbol representing the path course after the yaw, the tangential point being located at said position symbol, if geometrically realizable, or, if not geometrically realizable, at the point along the course line located closest to the position symbol, said point satisfying the geometric conditions, and the starting point of the yaw path determined by the above-mentioned conditions of calculation being indicated on the display screen by a second position symbol together with a second direction symbol indicating the actual path course.

33. A device as claimed in claim 17, wherein said control signal is a function of the quantity $R_b - R_a$.

34. A device as claimed in claim 17, wherein said control signal is a function of the quantity $R_b^{-1} - R_a^{-1}$.

35. A device as claimed in claim 17, wherein said control signal is a function of a quantity $\omega_b - \omega_a$.

36. A device as claimed in claim 17, wherein said control signal is a function of the quantity $\omega_b^{-1} - \omega_a^{-1}$.

37. A device as claimed in claim 17, wherein said control signal is a function of the quantity $V - R_b \omega_a$.

* * * * *